(12) United States Patent
Eida et al.

(10) Patent No.: US 7,074,314 B2
(45) Date of Patent: Jul. 11, 2006

(54) LIQUID REPELLENT MEMBER, METHOD FOR MANUFACTURING LIQUID REPELLENT MEMBER, INK JET HEAD USING LIQUID REPELLENT MEMBER, METHOD FOR MANUFACTURING INK JET HEAD AND METHOD FOR SUPPLYING INK

(75) Inventors: Masataka Eida, Kanagawa (JP); Kazuo Iwata, Kanagawa (JP); Toshinori Hasegawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 417 days.

(21) Appl. No.: 10/649,659

(22) Filed: Aug. 28, 2003

(65) Prior Publication Data

US 2004/0041883 A1 Mar. 4, 2004

Related U.S. Application Data

(62) Division of application No. 10/067,220, filed on Feb. 7, 2002, now Pat. No. 6,685,301.

(30) Foreign Application Priority Data

| Feb. 8, 2001 | (JP) | ............................. 2001-031658 |
| Mar. 26, 2001 | (JP) | ............................. 2001-087944 |
| Mar. 26, 2001 | (JP) | ............................. 2001-087945 |
| Mar. 26, 2001 | (JP) | ............................. 2001-087946 |
| Mar. 26, 2001 | (JP) | ............................. 2001-087947 |
| Jan. 31, 2002 | (JP) | ............................. 2001-023693 |

(51) Int. Cl.
*C25D 3/66* (2006.01)
(52) U.S. Cl. ...................... 205/206; 205/230; 205/231; 205/221

(58) Field of Classification Search ................. 205/50, 205/230, 231
See application file for complete search history.

(56) References Cited

U.S. PATENT DOCUMENTS

| 4,368,476 A | 1/1983 | Uehara et al. |
| 4,694,308 A | 9/1987 | Chan et al. |
| 4,716,423 A | 12/1987 | Chan et al. |
| 4,723,129 A | 2/1988 | Endo et al. |
| 4,740,796 A | 4/1988 | Endo et al. |
| 4,766,671 A * | 8/1988 | Utsumi et al. ................ 29/848 |
| 5,069,764 A * | 12/1991 | Watanabe et al. ........... 205/411 |
| 5,160,415 A * | 11/1992 | Kondo et al. ................ 205/411 |
| 5,262,802 A | 11/1993 | Karita et al. |
| 5,300,959 A | 4/1994 | McClelland et al. |
| 5,443,687 A | 8/1995 | Koyama et al. |
| 5,697,144 A | 12/1997 | Mitani et al. |
| 6,168,910 B1 * | 1/2001 | Hino et al. .................. 430/328 |
| 6,371,598 B1 * | 4/2002 | Fujii et al. .................... 347/54 |
| 6,402,304 B1 | 6/2002 | Qiu et al. |
| 6,433,303 B1 * | 8/2002 | Liu et al. ................ 219/121.7 |
| 6,523,938 B1 | 2/2003 | Sleger |
| 6,540,322 B1 * | 4/2003 | Usui et al. .................... 347/29 |

FOREIGN PATENT DOCUMENTS

EP 1 065 023 1/2001

(Continued)

*Primary Examiner*—Roy King
*Assistant Examiner*—William T. Leader
(74) *Attorney, Agent, or Firm*—Fitzpatrick, Cella, Harper & Scinto

(57) ABSTRACT

The present invention provides a liquid repellent member applied to ink jet, comprising a carbon substrate, and a liquid repellent film formed on a surface of the carbon substrate and formed by bonding between carbon and fluorine.

3 Claims, 22 Drawing Sheets

FOREIGN PATENT DOCUMENTS

| | | |
|---|---|---|
| JP | 59-192574 | 10/1984 |
| JP | 4-336258 | 5/1991 |
| JP | 5-116325 | 5/1993 |
| JP | 6-134984 | 5/1994 |
| JP | 7-257980 | 10/1995 |
| JP | 10-138496 | 5/1998 |
| JP | 2001-198684 | 7/2001 |

\* cited by examiner

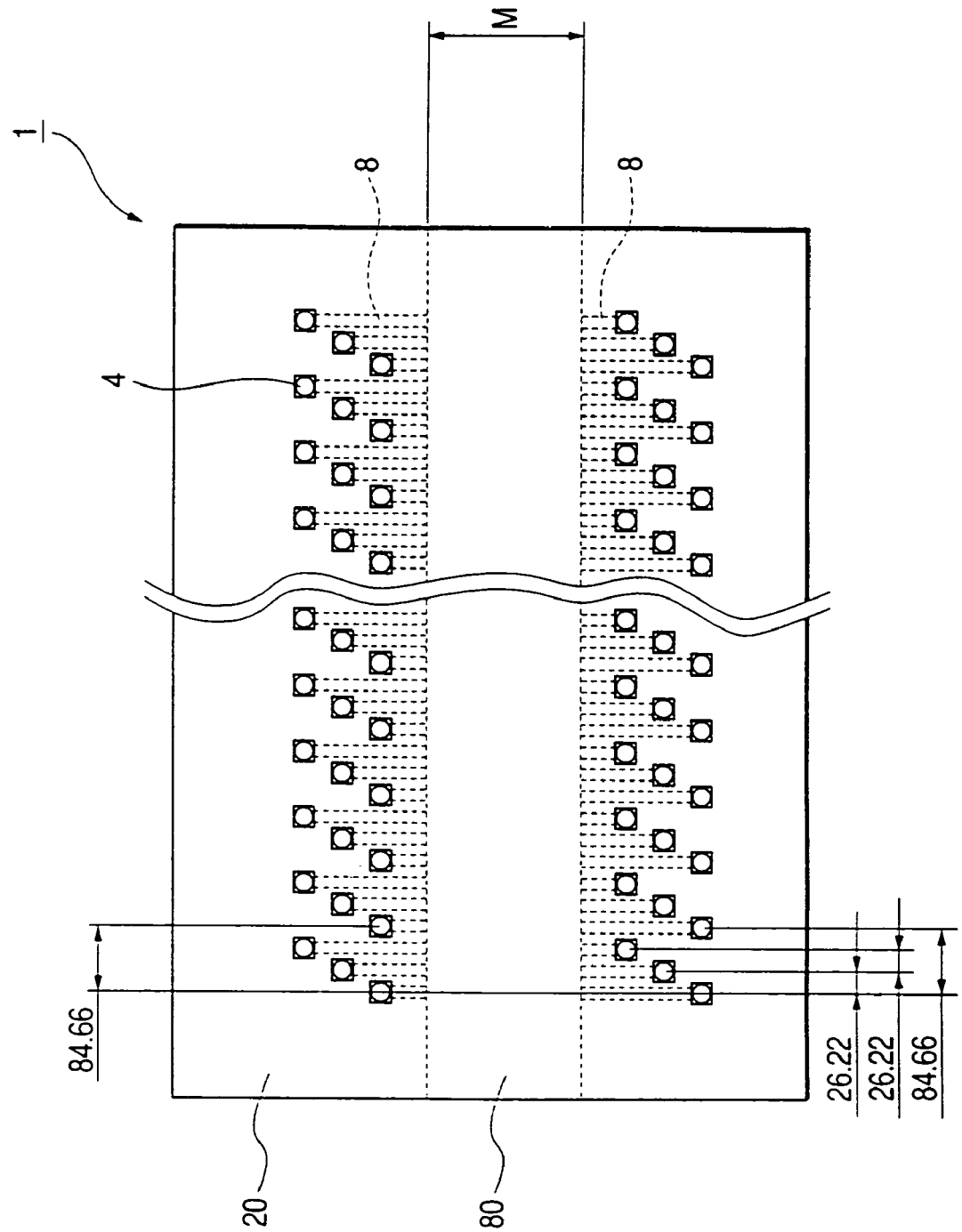

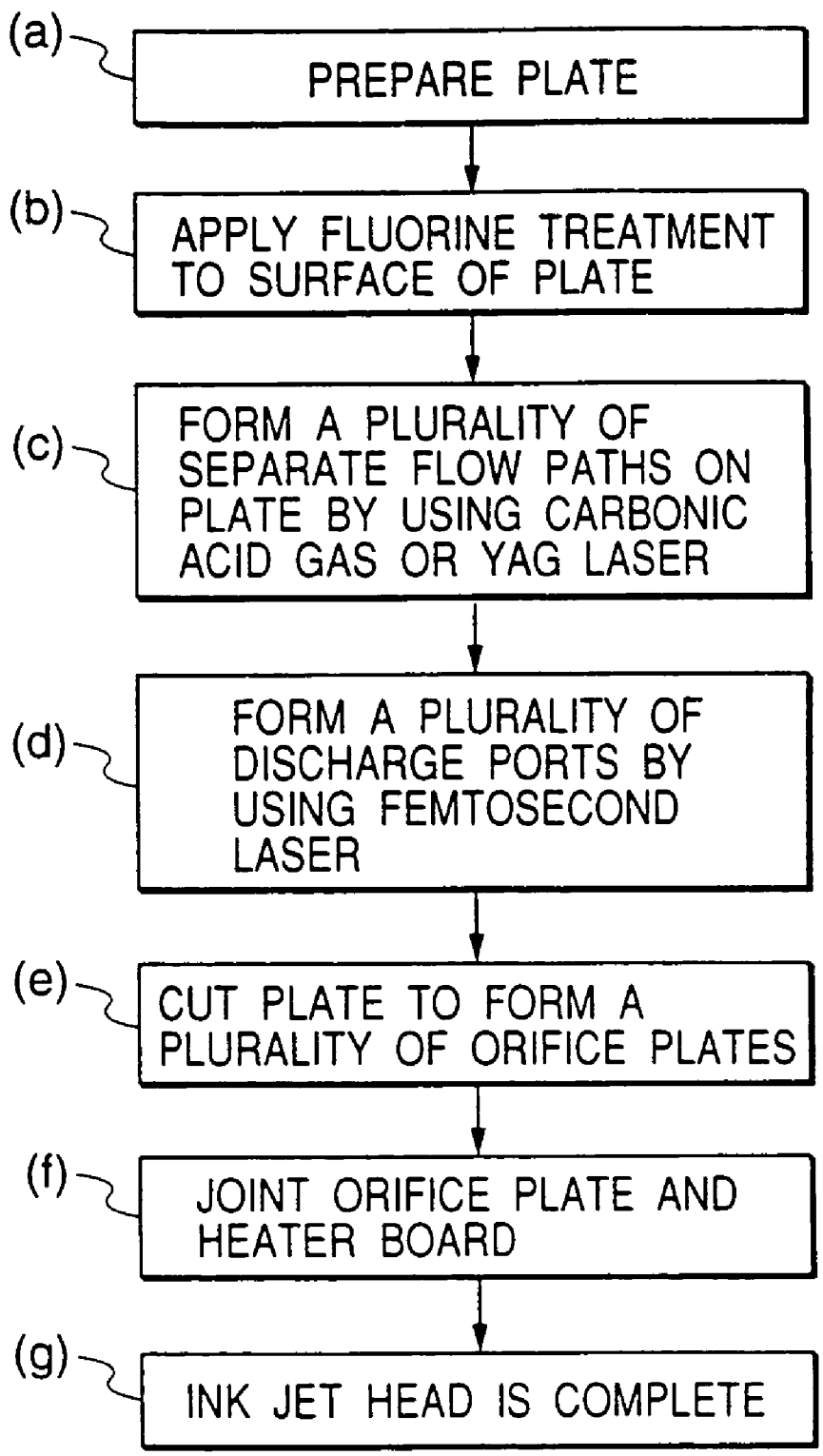

LIQUID REPELLENT MEMBER, METHOD FOR MANUFACTURING LIQUID REPELLENT MEMBER, INK JET HEAD USING LIQUID REPELLENT MEMBER, METHOD FOR MANUFACTURING INK JET HEAD AND METHOD FOR SUPPLYING INK

This is a divisional application of application Ser. No. 10/067,220, filed on Feb. 7, 2002, now U.S. Pat. No. 6,685,301.

BACKGROUND OF THE INVENTION

1. Field of the Invention

The present invention relates to a liquid repellent member, a method for manufacturing such a liquid repellent member, an ink jet head using such a liquid repellent member, a method for manufacturing such an ink jet head, and a method for supplying ink.

2. Description of the Related Art

In the past, a liquid repellent member having a surface for increasing a contact angle with respect to liquid has been used as various applications for various purposes. For example, the liquid repellent member is used in an ink jet head. In some ink jet heads, a discharge port constituting member for defining a plurality of discharge ports for discharging ink has a discharge port surface in which the plurality of discharge ports are formed, and such a discharge port surface is constituted by a liquid repellent member having liquid repellency.

Conventionally, as disclosed in U.S. Pat. Nos. 4,694,308, 4,716,423, 5,262,802 and 5,300,959, the discharge port constituting member of the ink jet head has been formed from nickel, polysulfone resin or polyimide resin. Further, in some examples, such a member is formed from a metal plate such as stainless steel, rather than nickel.

In order to achieve the liquid repellency of the discharge port surface of the discharge port constituting member, for example, when the discharge port constituting member is formed from polysulfone resin or polyimide resin, the repellency is realized by coating fluoride on the discharge port surface or by performing fluorine-plasma treatment. However, when the fluoride is coated, the fluoride is easily peeled by stress in a wiping operation, and, when the fluorine-plasma treatment is used, since the fluoride is merely formed as a surface layer of the discharge port surface having a thickness of about several Å, the fluoride is lost by wear due to stress in the wiping operation or the entire surface of the discharge port surface is not covered by the fluoride to create a surface portion having no fluoride, with the result that adequate liquid repellency cannot be obtained.

For example, Japanese Patent Application Laid-Open No. 05-116325 (1993) discloses a method (fluorine-plasma treatment) for forming a liquid repellent film having F—C bonding by forming a carbon skin film by deposition and by effecting discharging of the carbon skin film under the presence of nitrogen fluoride compound to generate plasma including fluorine.

According to this method, it is merely taught that a condition of the liquid repellent film has F—C bonding. Further, a liquid repellent level of the liquid repellent film is evaluated to be similar to a liquid repellent level obtained when the fluorine-plasma treatment is effected with respect to carbon included in organic resin itself such as polysulfone. This means that the entire surface of the liquid repellent film is not always in the F—C bonding condition.

Now, the reason will be explained.

When a carbon film is formed on a substrate 21 as shown in FIG. 25A by deposition, gloss of a surface of the substrate 21 is being lost. The reason is that, when fine carbon particles 22 are adhered to a film forming surface under the vacuum, since deposit as shown in FIG. 25B is formed, the surface becomes unevenness microscopically.

Thus, although it looks like that an F—C film is formed through the entire surface, as shown in FIG. 25C, microscopically, since the fluorine-plasma is not adhered to bottoms 24 of recesses and shadow areas of the fine carbon particles 22, the F—C film 23 is hard to be formed through the entire surface, and, in many cases, the entire F—C film is not formed.

Thus, by the method for effecting the fluorine-plasma treatment with respect to the carbon deposit film, an ink repellent film having ink repellency similar to that in the method for for effecting the fluorine-plasma treatment with respect to the polysulfone resin is merely obtained. That is to say, in the obtained article, areas 24 having no ink repellent film are dotted on the discharge port surface (FIG. 26).

When clean ink (composition: PEG=15%; IPA=3%, water=82%) is discharged, it was found that the surface of the substrate having the ink repellent film formed in this way ensures adequate ink repellency even when wiping operations are repeated by 2000 times, but, when the wiping operations repeated by 3000 times, the ink repellency of the surface is reduced to decrease a contact angle to about 70°. In such a contact angle, good ink discharging cannot be achieved, thereby causing deviation and/or image unevenness.

Further, when an orifice plate is formed from stainless steel or nickel, water repelling particles such as fine Teflon particles are included by about 7% to 18% by plating or seizure to obtain the liquid repellency of the discharge port surface. However, since the size of the particle is greater than 0.01 μm and the particles are not dispersed uniformly, in some cases, the discharging direction may become unstable. In this way, in the conventional orifice plates, adequate liquid repellency and endurance of liquid repellency cannot be obtained.

Further, coefficient of thermal expansion of metal used as material of the orifice plate is about 12 to $20 \times 10^{-6}$, and coefficient of thermal expansion of resin is about 8 to $200 \times 10^{-6}$. However, regarding the resins having the coefficient of thermal expansion of about 8 to $12 \times 10^{-6}$, in almost all cases, anisotropy is given by drawing/extending treatment so that the resin represents coefficient of thermal expansion of 8 to $12 \times 10^{-6}$ in a lateral direction (certain given direction) and coefficient of thermal expansion of about 50 to $100 \times 10^{-6}$ in a longitudinal direction (direction perpendicular to the certain given direction). Alternatively, a large amount of lithium oxide or ceramic filler representing negative coefficient of thermal expansion may be added to the resin.

In a case where the orifice plate is formed from a plate made of resin including such mix filler, when the discharge ports are formed in the orifice plate, shapes of the discharge ports will be distorted. In this case, when a diameter of the discharge port is about 60 μm, since the mix filler affects little influence upon the shapes of the discharge ports, the ink is discharged without any problem, but, when the diameter of the discharge port is smaller than about 15 μm, since the mix filler affects great influence upon the shapes of the discharge ports, the shapes of the discharge ports are greatly deformed, with the result that a stable image can almost not be obtained.

On the other hand, a plurality of recording elements provided in correspondence to the plurality of discharge ports to apply energy for discharging the ink to the ink are constituted by heat generating elements or piezo-vibration elements, and these elements are provided on a substrate made of silicon or ceramic. Coefficient of thermal expansion of the substrate is about 3 to $6 \times 10^{-6}/°$ C. Since such an ink jet head is driven to perform discharging operations by about 10000 times per second, a temperature of the head reaches about 70 to 80° C.

In such a condition, when a length of the ink jet head exceeds 0.85 inch (about 20 mm), the following problems will arise.

In a case where difference in coefficient of thermal expansion is greater than $4 \times 10^{-6}$, if difference in temperature becomes about 60° C. (for example, the temperature of the head is changed from 20° C. to 80° C.), a relative position between the driving element and the discharge port will be changed by 4 µm or more.

If the difference is 4 µm, when the ink is discharged onto the entire surface of a recording medium by serial print, positional deviation of 4 µm is generated in every scan, thereby causing density unevenness.

Accordingly, in an ink jet head in which a length of the ink jet discharging element substrate is selected to 20 mm or more in consideration of the influence of the difference in coefficient of thermal expansion between the ink jet discharging element substrate and the orifice plate, the temperature of the head is detected, and, when the temperature change reaches 30 to 40° C., the driving of the head is temporarily stopped, and, after the head temperature is decreased, the print is re-started. Particularly, when photo-like image print is effected, further careful head driving is required.

In this way, when a length of discharge port array is increased or arranging density of the discharge ports is increased in order to achieve higher speed and highly fine recording, the positional relationship between the orifice plate and the discharge element substrate is deviated due to the difference in coefficient of thermal expansion, abnormal ink flying may be generated in the vicinity by both ends of the discharge elements or the head may be damaged.

As mentioned above, the characteristics required for the discharge port constituting member (orifice plate) are that the discharge port surface has high ink repellency and the endurance of the ink repellency is excellent and that the coefficient of thermal expansion of the substrate (discharge element substrate) on which the discharge elements are provided is substantially the same as that of the orifice plate. However, as mentioned above, the conventional discharge port constituting members cannot satisfy these characteristics.

SUMMARY OF THE INVENTION

Accordingly, an object of the present invention is to provide an ink jet head and a method for manufacturing such an ink jet head, in which stable and high quality recording can be achieved by adopting a discharge port constituting member using a liquid repellent member satisfying the above characteristics.

The present invention achieves the above object by providing a liquid repellent member, a method for manufacturing such a liquid repellent member, an ink jet head using such a liquid repellent member, or a method for manufacturing such an ink jet head according to the following aspects (1) to (30).

(1) A liquid repellent member applied to ink jet, comprising a carbon substrate, and a liquid repellent film formed on a surface of the carbon substrate and formed by bonding between carbon and fluorine.

(2) A liquid repellent member applied to ink jet, comprising an FC ink repellent film formed by forming a through-hole in a carbon substrate and by electrolytically processing the substrate in molten salt of fluoride.

(3) A method of manufacturing a liquid repellent member which comprises a carbon substrate and on a surface of which a liquid repellent film formed by bonding between carbon and fluorine is formed, comprising a step for forming the liquid repellent film on the surface.

(4) A method according to the aspect (3), further comprising a step for forming the liquid repellent film on the surface by applying voltage to the carbon substrate in a condition that the carbon substrate is immersed in molten salt of fluoride.

(5) A method according to the aspect (3), further comprising a step for forming the through-hole by illuminating femtosecond laser onto the liquid repellent member.

(6) A method according to the aspect (5), wherein the step for forming the through-holes is effected while sending out gas including oxygen in the vicinity of an area of the liquid repellent member on which the femtosecond laser is illuminated.

(7) A method for manufacturing a plurality of liquid repellent members on surfaces of which liquid repellent films formed by bonding carbon and fluorine are formed, comprising the steps of collectively forming the liquid repellent films on the surfaces of the carbon plate by applying voltage to the carbon plates in a condition that a carbon plate corresponding to the plural liquid repellent members is immersed in molten salt of fluoride, and dividing the carbon plate formed with the liquid repellent films to obtain the plural liquid repellent members.

(8) An ink jet head comprising a discharge port constituting member formed from carbon and having a plurality of discharge ports for discharging ink, and a discharge port surface on which an ink repellent film formed by bonding between carbon and fluorine is provided.

(9) An ink jet head according to the aspect (8), further comprising a silicon recording element substrate on which a plurality of recording elements for applying energy for discharging ink from the respective discharge ports to the ink are provided in correspondence to the plurality of discharge ports.

(10) An ink jet head according to the aspect (8), wherein the discharge port constituting member comprises crystal body or non-crystal body of carbon.

(11) An ink jet head according to the aspect (10), wherein the crystal body is single crystal body.

(12) An ink jet head according to the aspect (10), wherein the non-crystal body is carbon compound including nitrogen.

(13) An ink jet head according to the aspect (10), wherein the discharge port constituting member has ink flow paths communicated with the respective plural discharge ports.

(14) An ink jet head according to the aspect (13), wherein the discharge port constituting member has a common ink flow path with which the plurality of ink flow paths are communicated.

(15) An ink jet head according to the aspect (8), wherein the discharge port constituting member has a rib on a side of the discharge port surface.

(16) A method for manufacturing an ink jet head comprising a discharge port constituting member formed from carbon and having a plurality of discharge ports for discharging ink, and a discharge port surface on which an ink repellent film formed by bonding between carbon and fluorine is provided, comprising a step of forming a discharge port constituting member, said step including a step of forming said ink repellent film on said discharge port surface and a step for forming said plurality of discharge ports on said constituting member formed with said ink repellent film.

(17) A method according to the aspect (16), wherein the processing for forming the discharge port constituting member includes a step for forming the liquid repellent film on the discharge port surface by applying voltage to the discharge port constituting member in a condition that the discharge port constituting member is immersed in molten salt of fluoride.

(18) A method according to the aspect (17), wherein the processing for forming the discharge port constituting member includes a step for polishing a surface of the discharge port surface of the discharge port constituting member to a flat state, and a step for forming the liquid repellent film on the discharge port surface by applying the voltage to the discharge port constituting member in a condition that the polished surface of the discharge port constituting member is immersed in the molten salt of fluoride.

(19) A method according to the aspect (18), wherein, in the processing for forming the discharge port constituting member, the polishing step is a step for effecting the polishing while fixing a surface opposite to the surface of the discharge port surface of the discharge port constituting member onto a polishing table, and the step for forming the ink repellent film is effected in a condition that the discharge port constituting member is fixed to the polishing table.

(20) A method according to the aspect (17), wherein a step of forming said discharging port constituting members comprising a step for collectively forming the ink repellent films on the discharge port surfaces of a plurality of discharge port constituting members by applying voltage to a carbon plate in a condition that the carbon plate corresponding to the plurality of discharge port constituting members is immersed in the molten salt, and a step for dividing said carbon plate formed with said ink repellent film into said plurality of discharge port constituting members.

(21) A method according to the aspect (20), wherein the processing for forming the discharge port constituting member includes a step for polishing a discharge port surface side surface of the carbon plate to a flat state, and a step for forming the ink repellent films on the discharge port surfaces by applying voltage to the discharge port constituting members in a condition that the polished surfaces of the discharge port constituting members are immersed in the molten salt of fluoride.

(22) A method according to the aspect (21), wherein, in the processing for forming the discharge port constituting member, the polishing step is a step for effecting the polishing while fixing a surface of the carbon plate opposite to the discharge port surface side surface onto a polishing table, and the step for forming the ink repellent films is effected in a condition that the carbon plate is fixed to the polishing table.

(23) A method according to the aspect (16), wherein the processing for forming the discharge port constituting member includes a step for forming the plurality of discharge ports by illuminating femtosecond laser onto portions corresponding to the plurality of discharge ports of the discharge port constituting member.

(24) A method according to the aspect (23), wherein the step for forming the discharge ports is effected while sending out convey gas having oxygen density of 5 to 10% onto an area in the vicinity of a portion of the discharge port constituting member onto which the femtosecond laser is illuminated.

(25) A method for supplying ink to an ink jet head, wherein the ink jet head comprises a liquid repellent member having an FC ink repellent film formed by forming a through-hole in a carbon substrate and by electrolytically processing the substrate in molten salt of fluoride, an air suction hole, ink, an ink jet discharge element, an ink absorbing body, an ink jet head frame and an air suction device.

(26) A method according to the aspect (25), wherein the liquid repellent member and the ink absorbing body are arranged in contact with each other, and the ink is supplied to the ink jet head by sucking air from the air suction hole provided in the liquid repellent member.

(27) A method according to the aspect (26), wherein the air suction hole is located at a position different from a position of an ink supply port to the ink jet discharge element.

(28) A method according to the aspect (27), wherein suction pressure for the air is smaller than meniscus maintaining pressure of the ink jet discharge element.

(29) A method according to the aspect (28), wherein the supplying of the ink is effected by thrusting an ink supply needle to suck the air from the air suction hole.

(30) A method for manufacturing a liquid repellent member in which a liquid repellent film is formed on a surface of a substrate, comprising a step for forming the liquid repellent film on the surface of the substrate by applying voltage to the substrate in a condition that the substrate is immersed in molten salt of fluoride.

Incidentally, in the present invention, the carbon substrate includes a structure comprised of carbon compound including nitrogen of about several %, as well as a structure comprised of carbon atoms of 100%.

BRIEF DESCRIPTION OF THE DRAWINGS

FIG. 7 is a plan view showing a further arrangement of plural discharge ports in the ink jet head according to a second embodiment of the present invention;

FIG. 8 is a flow chart for explaining an example of an ink jet head manufacturing method according to a third embodiment of the present invention;

DESCRIPTION OF THE PREFERRED EMBODIMENTS

First of all, a general embodiment of the present invention will be explained with reference to the accompanying drawings.

FIGS. 1A to 1E are schematic sectional views showing steps for forming discharge ports in a discharge port constituting member (orifice plate) formed by a carbon substrate according to the present invention.

Hereinafter, the discharge port constituting member will be referred to as an orifice plate.

Figure 1A:
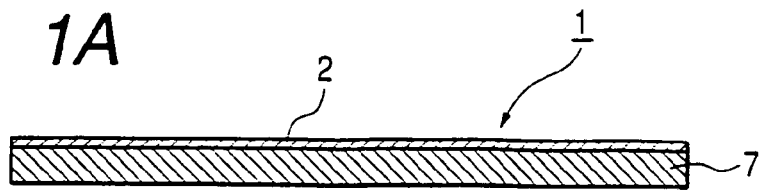
FIGS. 1A, 1B, 1C, 1D and 1E are schematic sectional views showing steps for forming discharge ports in a discharge port constituting member (orifice plate) formed by a carbon substrate according to the present invention.
Figure 1B:
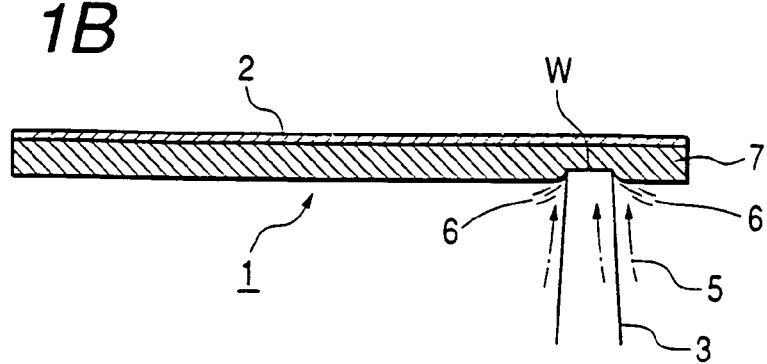
Figure 1C:
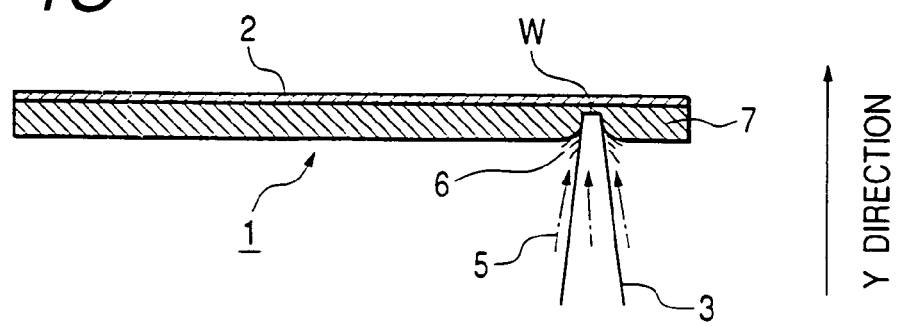
Figure 1D:
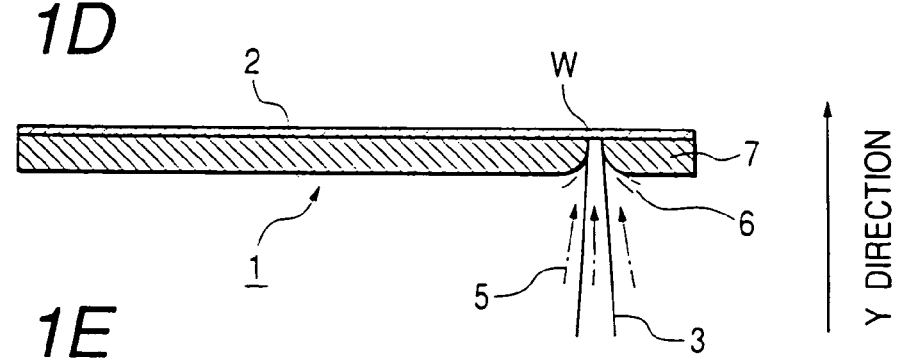

As shown in FIG. 1A, an ink repellent film 2 is formed on an upper surface of an orifice plate 1 by a molten salt electrolysis method and the like. Incidentally, the reference numeral 7 denotes a carbon substrate portion which does not react with fluorine.

According to the molten salt electrolysis method, the ink repellent film 2 comprised of fine and strong FC (fluorocarbon) which will be described later is formed on a discharge port surface.

When voltage is applied to a carbon substrate in a condition that the carbon substrate is immersed in molten salt of fluoride, electro-chemical reaction is generated between carbon and fluorine by molten salt electrolysis of carbon and fluorine, thereby forming an FC film. In this case, since current density is concentrated into portions which FC films are not formed, the FC film is formed uniformly. Further, once a surface is coated by the FC film, then, the FC film grows by substitution chemical reaction (diffusion of F atoms), rather than the electro-chemical reaction. When the immersing time is elapsed by about 1 hour, a film thickness of the FC film reaches about 2 µm.

Incidentally, in normal ion plating or plasma treatment in fluorine gas, not only fluoride having only thickness of about several Å is merely formed on the surface, but also the entire surface is not covered by the fluoride thereby to generate areas having no fluoride.

Incidentally, when the fluorocarbon film is formed on the carbon substrate in this way, in order to ensure easy handling and economy, is is desirable that a single large plate-shaped carbon substrate constituting a plurality of orifice plates is subjected to fluoridation processing.

The reason is that, by doing so, the number of immersion working steps for immersing an object into molten salt of fluoride is greatly decreased. For example, although it is easy to immerse a single large plate into the molten salt while holding an end (portion not used and removed) of the plate to achieve the fluoridation treatment with little labor, if a carbon plate is cut to obtain individual orifice plates and the respective orifice plates processed, since an exclusive fixedly holding tool must be manufactured and the respective orifice plates must be mounted to the tool and be immersed, the number of working steps will be increased greatly.

Further, when the plate is immersed into the molten salt, fundamentally, the atmosphere must be an oxygen free area such as $N_2$ area. Thus, the immersing treatment must be hastened for a short time. Further, since the molten salt has a liquid state, when the carbon plate is immersed into the molten salt, due to gravity, it is preferable that the carbon plate be immersed from the above. In this case, since density of the molten salt is substantially the same as or slightly smaller than that of the carbon plate, the carbon plate must be prevented from floating due to a shock or resistance upon immersion. In a large carbon plate, although it is easy to immerse the plate from the above while grasping a part or periphery of the plate, in a divided (small) plate, it is required that the plate be immersed in a condition that the plate is fixed to any tool by any method such as suction fixing or temporary bonding. Thus, it is more preferable that the large carbon plate is immersed. Further, when the large carbon plate is cut into the individual orifice plates, since positional dispersion of several µm is generated, in a subsequent step, when a silicon heater board is joined to the orifice plate, alignment must be effected each time. However, when the large plate is subjected to the fluoridation processing as it is, such alignment may be effected only once to fix the plate and then be joined to the silicon heater board.

The carbon substrate on which the fluorocarbon film is formed in this way is fixed onto a laser working table, and a plurality of discharge ports 4 are formed by illumination of femtosecond laser 3. As a method for forming the discharge ports 4 using such femtosecond laser 3, a part of a method disclosed in Japanese Patent Application Laid-open No. 2001-198684 can be utilized.

Incidentally, when the carbon substrate is worked by using the femtosecond laser, although the carbon is once evaporated to be sublimited into air, the carbon may be adhered to the substrate again due to decrease in temperature. However, it is possible to remove the sublimated carbon by flowing out ambient air at a high speed. Further, when gas including oxygen such as air is applied, the re-adhesion is prevented since the gas reacts against $CO_2$. However, if the femtosecond laser is illuminated onto the carbon within the air, due to chemical reaction between the carbon and oxygen, since heat generating reaction to $CO_2$ is generated with the result that surrounding carbon portion may be burned, when the air is flown at the high speed, it is desirable to adjust oxygen density to about 5 to 10%.

In fact, in the case where the ink jet discharge ports are formed in the carbon orifice plate by illuminating the femtosecond laser, when the oxygen density is selected to 0%, 5%, 10% or 15% and the flowing speed of convey gas is selected to 5 $m^3$/min, it was found that, in oxygen density of 0%, carbon powder is adhered to ends of the carbon orifice plate and cleaning is required, but, in oxygen density of 5% to 15%, such a phenomenon does not occur. However, when the oxygen density is selected to 15%, it was found that outlet portions of the ink jet discharge ports are slightly flagged. When the oxygen density is selected to 5% to 10%, it was found that the ink jet discharge ports can well be formed.

Figure 1E:
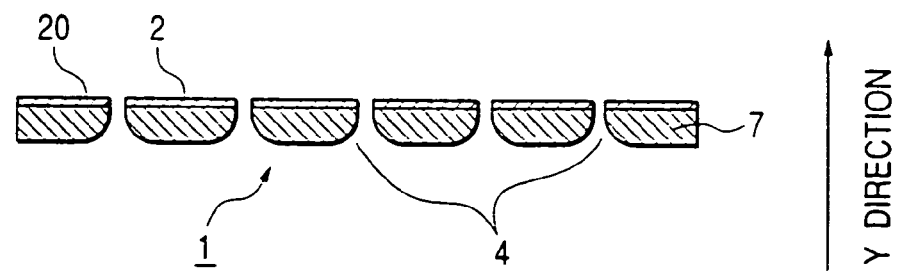

In this way, as shown in FIG. 1E, the orifice plate 1 in which the fluorocarbon film is formed on the discharge port surface and the plurality of discharge ports 4 are formed is obtained.

Figure 2A:
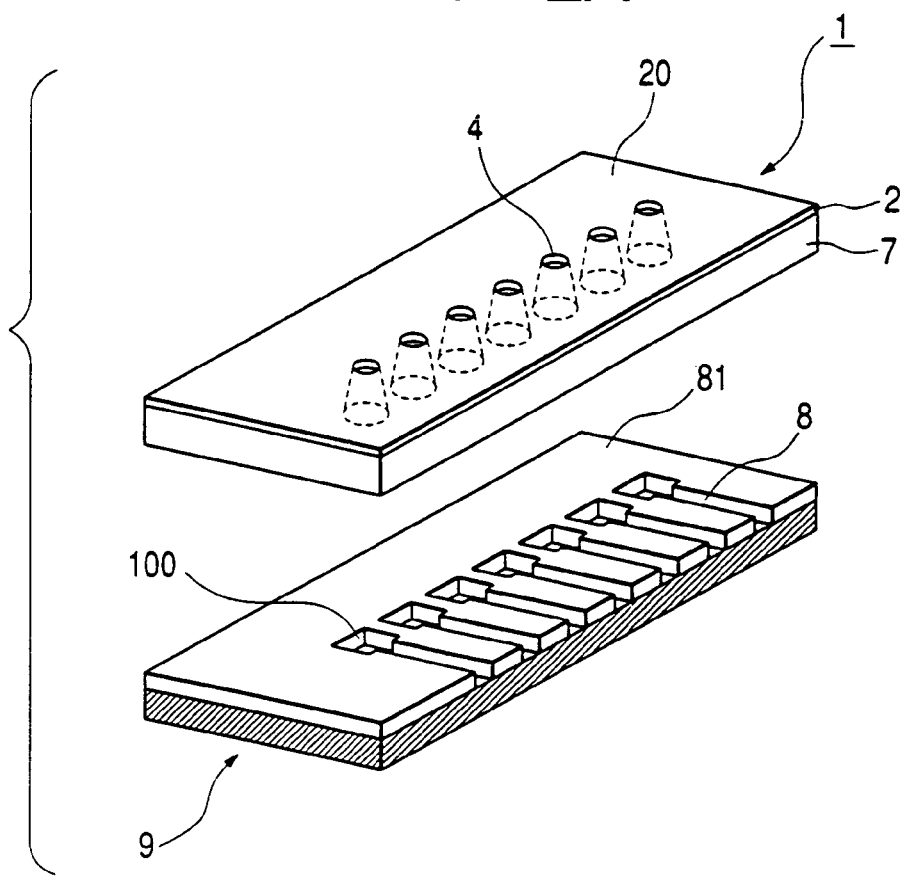
FIG. 2A is an exploded perspective view of an ink jet head and FIG. 2B is a perspective view of the assembled ink jet head.
Figure 2B:
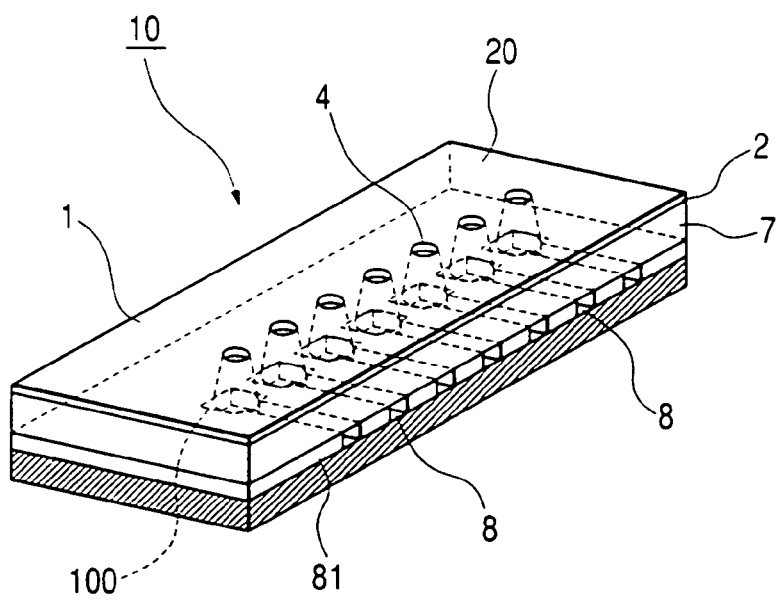
Figure 3:
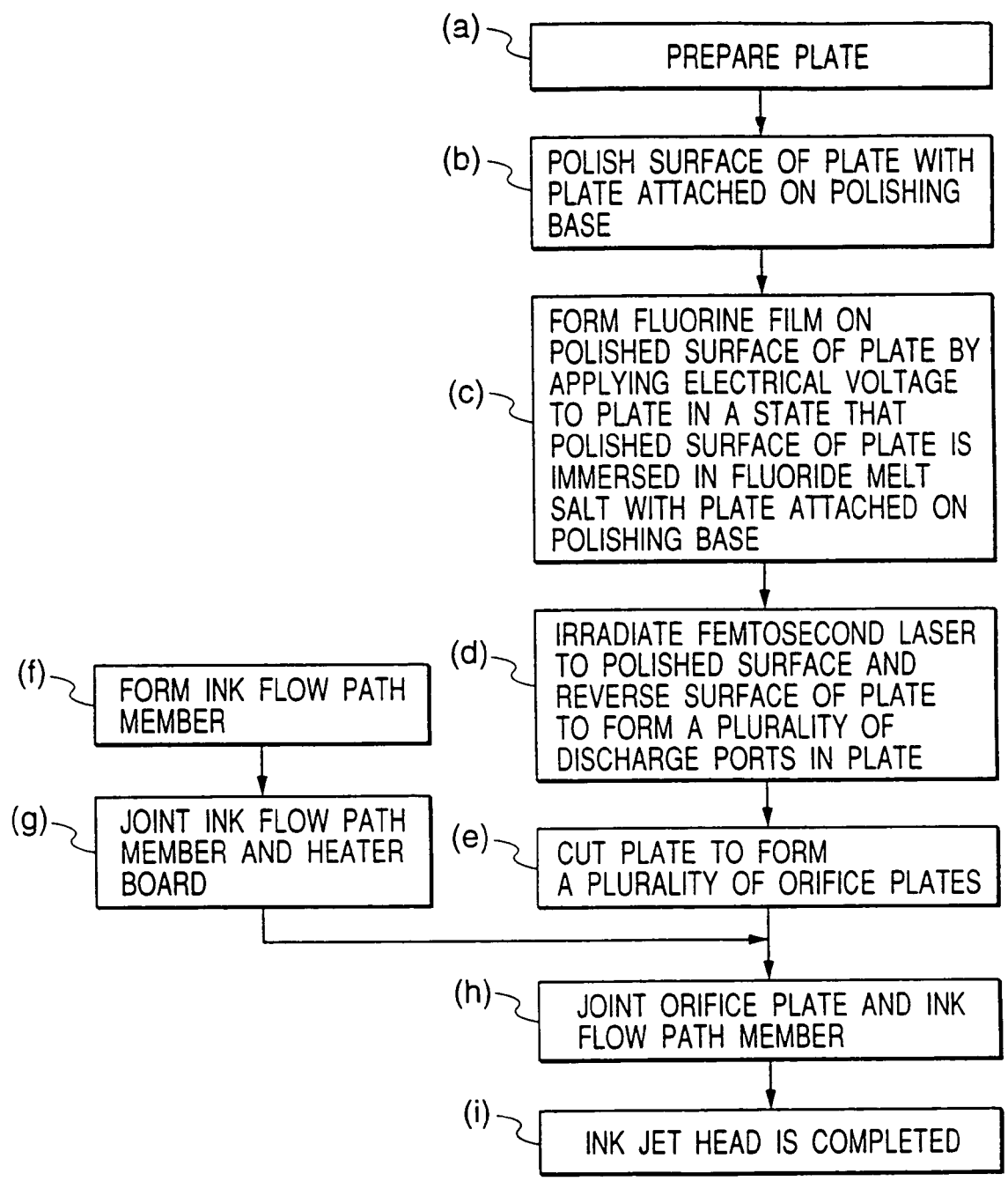
FIG. 3 is a flow chart for explaining an example of an ink jet head manufacturing method according to a first embodiment of the present invention.

As shown in FIG. 2A, by attaching the orifice plate 1, by an adhesive, to an ink jet driving element 9 in which in flow paths 8a and ink jet heating portions 100 are formed in an ink flow path constituting member 81, an ink jet head 1 as shown in FIG. 2B is formed.

EXAMPLE 1

Now, an example 1 of the present invention will be explained with reference to FIGS. 1A to 1E, FIGS. 2A and 2B and FIG. 4.

As a crystal carbon constituting member as a member for constituting the orifice plate, c/c composite crystal carbon body manufactured by Nissin Boseki Co., Ltd. (Japan) was used. This is crystal body of carbon which has no internal fine bubbles and is fine and has high bending elastic modulus, Young's modulus and breaking strength and, thus, which is suitable for fine working. Further, in the vicinity of a temperature of 0 to 100° C., coefficient of thermal expansion of the carbon crystal body is about $3.1 \times 10^{-6}$/° C. which is the substantially the same as that of silicon. A cylindrical rod stock fired to have a diameter of about 70 mm was cut to obtain a plate material having a thickness of about 0.2 mm, and this plate material was attached to and polished and ground by a polishing machine, thereby obtaining a plate having a thickness of 0.075 mm.

The plate comprised of a carbon substrate obtained in this way was immersed into molten salt of mixture of sodium fluoride and lithium fluoride at a temperature of about 800° C. within nitrogen gas atmosphere, and, by applying voltage to the plate, an ink repellent film 2 having a depth of about 0.01 μm was formed on the polished surface of the plate (FIG. 1A). Incidentally, the plate corresponds to a plurality of orifice plates 1.

In this case, by immersing the plate having the thickness of 0.075 mm into the molten salt while being attached to the polishing table, it was possible to form the fluorocarbon film only on the polished surface. If the substrate alone is immersed, fluoride films will be formed on both surfaces of the substrate. In this case, when the ink jet head is formed, since the firm must be removed from either one of the surfaces in consideration of prevention of adhesion and ink flow. Thus, the former immersion was adopted.

The fluoride film formed in this way represents ink repellency and has a property for preventing the orifice plate 1 from being wetted by ink. Further, the film has high hardness, so that the film is hard to be worn even by ceramic powder included in paper such as talk and/or titanium oxide.

Then, the plate 1 was picked up and was fixed to a laser working table, and a plurality of discharge ports 4 were formed in the plate by illumination of femtosecond laser 3. As a method for forming the discharge ports 4 using such femtosecond laser 3, a part of a method disclosed in Japanese Patent Application Laid-open No. 2001-198684 was utilized. In this case, oxygen density of convey gas was selected to 5% and a feeding speed of the convey gas was selected to 5 $m^3$/min.

Integrated density of the discharge ports 4 formed in this way is about 500 dpi. Further, the plate having the diameter of about 70 mm was divided to obtain a plurality of orifice plates each having a length of 1 inch or more and including a discharge port 4 array having a length of about 27 mm.

The orifice plate 1 from which the discharge ports 4 are opened was attached to an ink jet driving element portion 9 (FIG. 2A), thereby obtaining an ink jet head 10 (FIG. 2B).

The ink jet driving element portion 9 is constituted by joining an ink flow path constituting member 81 for conveying the ink up to ink jet driving elements 100 to a substrate 91 (disclosed in U.S. Pat. Nos. 4,723,129 and 4,740,796 as conventional technical examples) in which electrode circuits, heating element portions and a protection film are formed on a silicon substrate.

The ink flow path constituting member 81 may be obtained by working carbon constituting body used in the present invention or polyimide or other ceramic to have a shape shown in FIG. 2A. Fundamentally, the same or similar values of coefficient of thermal expansion are desirable. In the illustrated example, the ink flow path constituting member 81 was formed by laser-working alumina ceramic, and such a member was used. The alumina plate was obtained by grinding and polishing an alumina plate having a thickness of 100 μm to reach a thickness of 60 μm. This was formed by fused scattering working by means of a YAG laser. As a result that printing was effected by using the ink jet head 10, it was found that good ink jet discharging can be achieved.

Regarding an ink jet discharge face 20 of the ink jet head 10 formed in this way, i.e., the ink repellent surface of the orifice plate 1, in a case where clear ink (composition: PEG=15%, IPA=3%, water=82%) was discharged, even when wiping operations were repeated by 5000 times, it was found that well ink repellency is maintained and a contact angle represents 150° or more.

Further, as a result that the print was effected after the ink repellent surface of the orifice plate 1 was rubbed by an edge of plain paper, it was found that noticeable abnormality could not be recognized.

As a comparison, as a result that an ink jet head having an orifice plate made of polyimide was subjected similar test, it was found that the polyimide orifice plate is apparently damaged and ink discharging directions dispersed upon ink discharging.

Incidentally, although the fact that the orifice plate is rubbed by the edge of the plain paper does not occur in the normal printing, if paper is jammed in the printer, such rubbing may occur. Further, although the jam does not normally occur by 2000 times, such a test was performed for confirmation or stability.

Then, as a result that the print was effected after a temperature resisting environmental tests in which a temperature is changed from −20° C. to 70° C. two hours apart were repeated by 10 times with respect to the ink jet head 10, it was found that, in the ink jet head using the orifice plate 1 of the present invention, the print can be achieved without any problem, but, in an ink jet head using an orifice plate made of polyimide resin, both end elements represent abnormality of discharging to differentiate the ink flying direction in comparison with the direction before the test, and, when the solid black print is performed, slight white stripes generated due to deviation of the print position.

Incidentally, in the illustrated example, while the plate obtained by cutting the c/c composite crystal carbon body manufactured by Nissin Boseki Co., Ltd. (Japan) and fired to have the diameter of about 70 mm was used as the member for constituting the orifice plate, crystalline carbon constituting members formed in the following manners may be used.

That is to say, crystalline carbon powder may be solidified by using binder and the solidified powder may be maintained within an inert gas atmosphere for a long term at a temperature of 2000 to 3000° C. to swell crystal particles up to 40 mm or more, and the resulting article may be cut to obtain a plate.

Alternatively, fine polycrystal carbon may be subjected special heat treatment with polycarbodiimide resin as binder by using a part of a method disclosed in Japanese Patent Application Laid-open No. 07-257980 (1995) to form a fine crystalline carbon constituting member having no void therein, which may in turn be cut to obtain a plate.

Further, as a constituting body for the discharge port constituting member, a non-crystalline carbon constituting body including nitrogen formed in the following manner (for example, non-crystalline carbon/nitrogen constituting body) may be used.

That is to say, polycarbodiimide resin is extruded or injection-molded under a special condition, and the resulting resin is fired within a special atmosphere at a temperature of 1600 to 3000° C. to obtain non-crystalline carbon constituting body, which in turn cut to obtain a plate.

(Second embodiment)

Next, a second embodiment of the present invention will be explained with reference to the accompanying drawings.

By using FIG. 4, an example that two or more arrays of discharge ports are formed, rather than a single array of discharge ports, will be explained.

A thickness of a plate 1 comprised of a carbon substrate similar to that used in the first embodiment is selected to 55 µm, and an ink repellent film 2 comprising fluorine bonding is formed thereon by a melt salt electrolytic process. The plate 1 is subjected to laser working in the same manner as the first embodiment.

Figure 4:
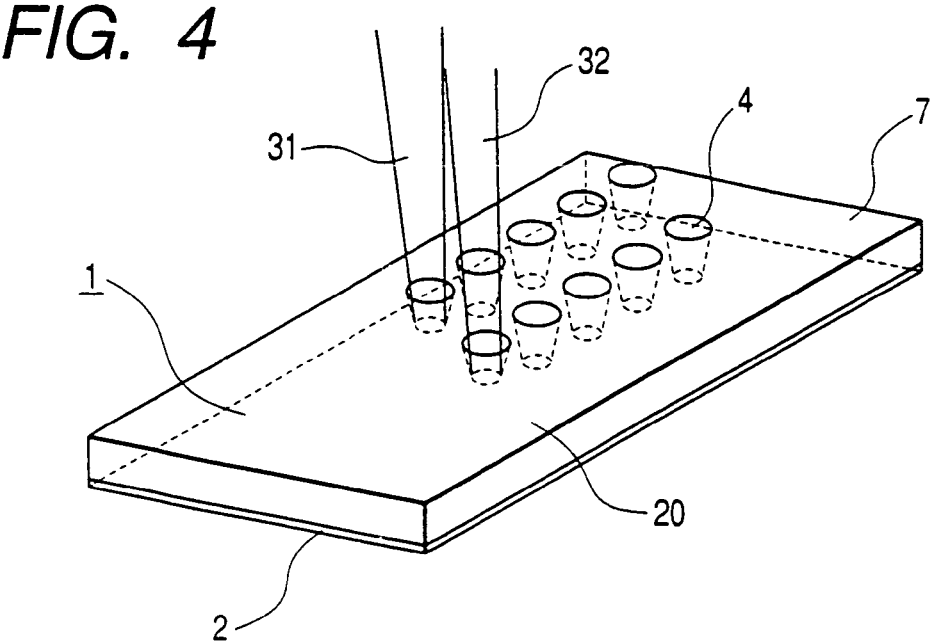
FIG. 4 is a schematic perspective view showing a case where a plurality of discharge ports are arranged in a plane in a two-dimensional fashion, in an ink jet head according to a second embodiment of the present invention.

In the second embodiment, as shown in FIG. 4, two spots of femtosecond laser beams 32, 32 are used. Each spot is moved at a pitch of 84.66 µm.

Figure 5:
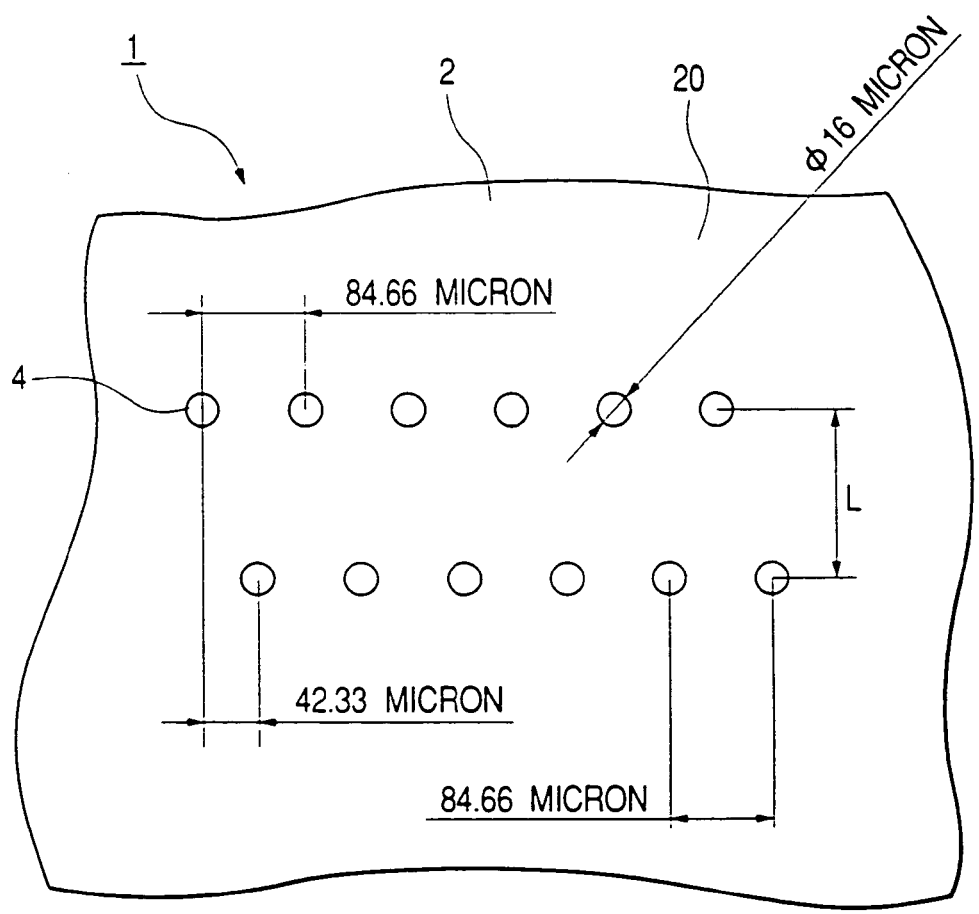
FIG. 5 is a partial plan view for explaining a positional relationship between a laser beam and the discharge ports of the ink jet head according to the second embodiment of the present invention.

Further, a positional relationship between the laser beam 31 and the other laser beam 32 is selected as shown in FIG. 5. With this relationship, it is possible to form an ink jet head having 600 dpi (printing discharge port density) (although 300 dpi essentially) without deviating a timing for discharging ink jet.

Further, since the pitch between the discharge ports 4 is 84.66 µm, it is possible to widen a diameter of an ink flow-in side of each discharge port 4 to about 60 µm, with the result that a sectional curve becomes more gentle to enhance convergence of shock discharge wave of ink jet discharge in a Y-direction, thereby more stabilizing the discharging direction.

Furthermore, even when the array of the discharge ports 4 is lengthened, the array is hard to be damaged, and, thus, the array can be lengthened up to about 2 or 3 inches.

In the past, due to the presence of the ink jet driving element portions, although the ink jet head could not have a length up to 0.5 inch, the orifice plate having a length of about 2 inches could be manufactured. And, the ink jet head using the orifice plate having a length of 0.5 inch could discharge the ink without any problem.

Figure 6:
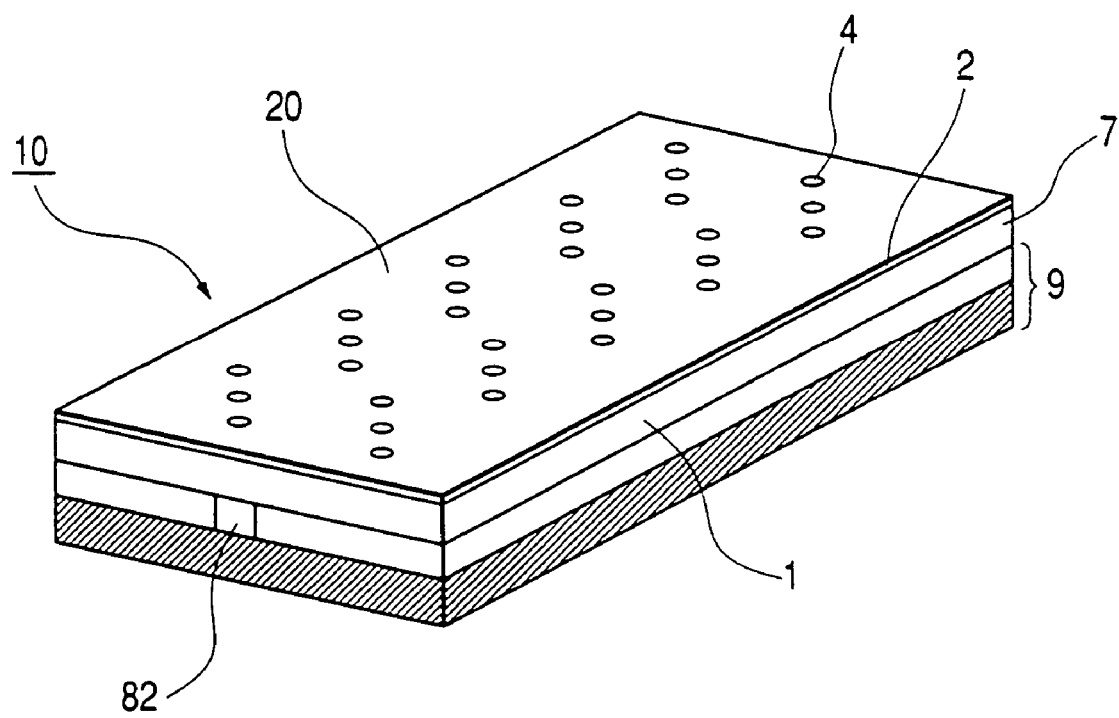
FIG. 6 is a schematic perspective view showing another arrangement of plural discharge ports in the ink jet head according to a second embodiment of the present invention.
Figure 9A:
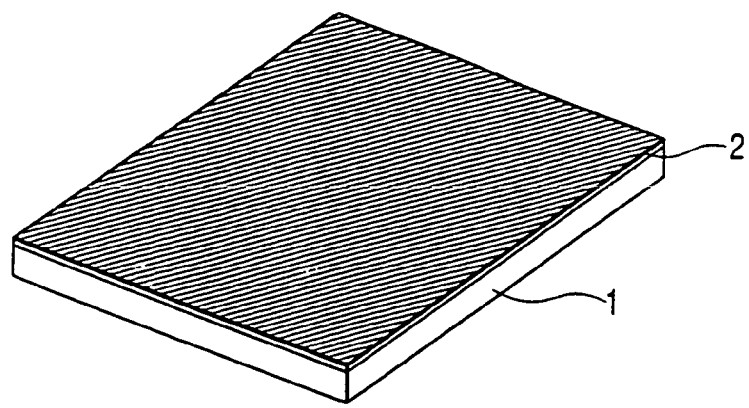
FIGS. 9A, 9B, 9C and 9D are views for explaining steps of the ink jet head manufacturing method according to the third embodiment of the present invention.
Figure 9B:
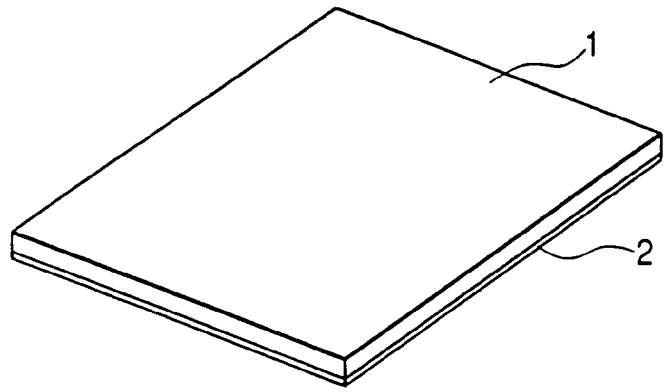
Figure 9C:
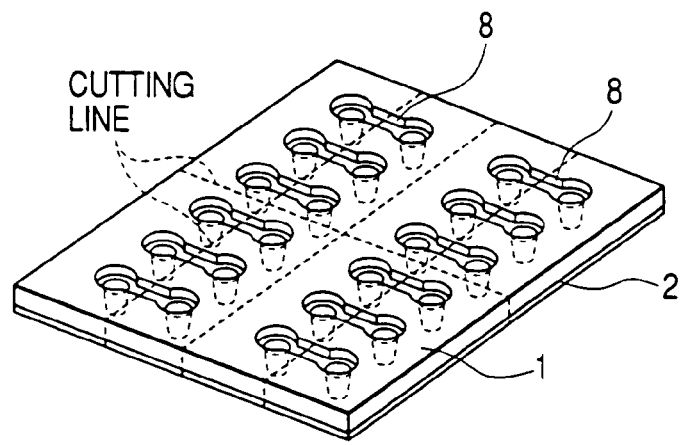
Figure 9D:
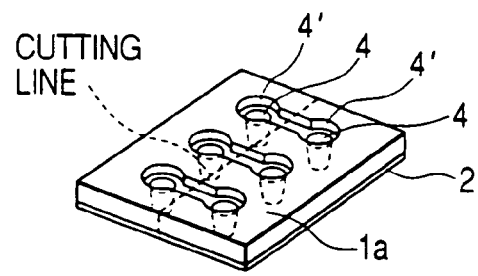

Here, FIG. 6 shows an example of an ink jet head having six arrays of discharge ports, and FIG. 7 is a plan view showing an arrangement of the arrays of discharge ports.

In the second embodiment, it is possible to manufacture an orifice plate 1 having such an arrangement.

(Third embodiment)

In the ink jet head explained in the first embodiment, while an example that the orifice plate and the ink flow path constituting member are formed independently and then the ink jet head is obtained by joining these members together was explained, in a third embodiment of the present invention, an orifice plate and an ink flow path constituting member are integrally formed by using a carbon substrate. The other constructions are the same as those in the first embodiment.

Figure 10:
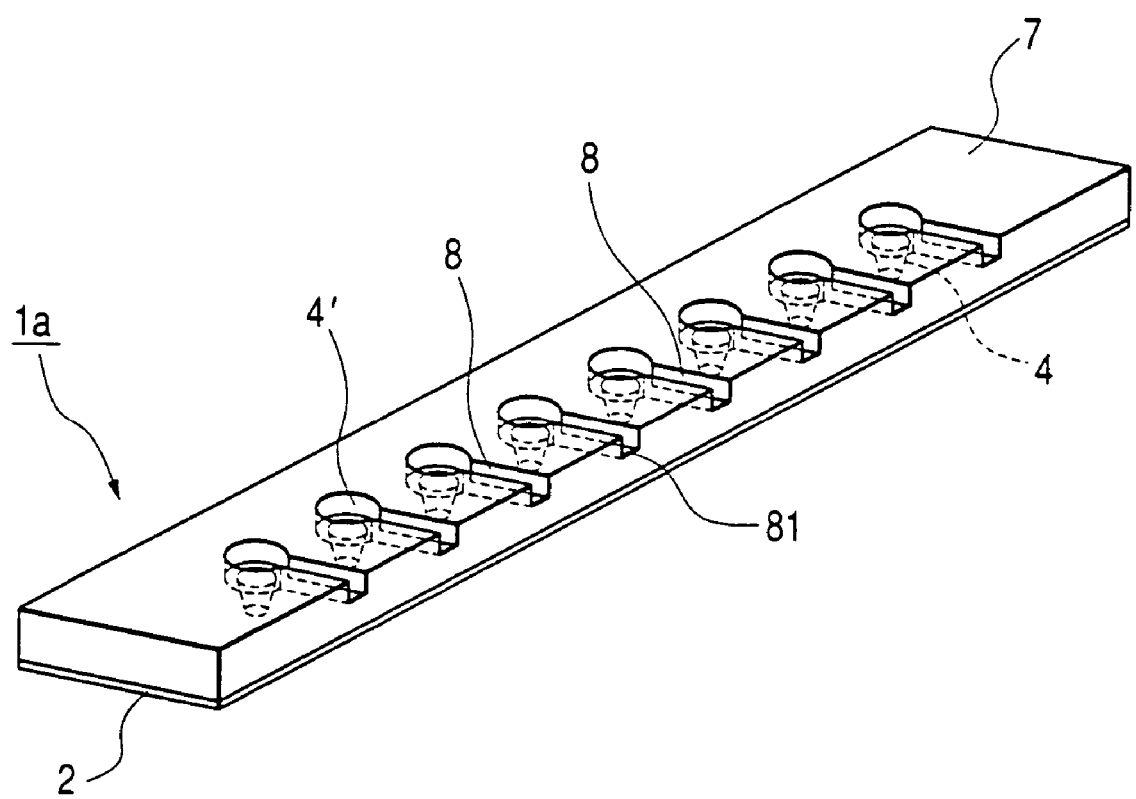
FIG. 10 is a schematic perspective view showing an example of an orifice plate constituting the ink jet head according to the third embodiment of the present invention.
Figure 11:
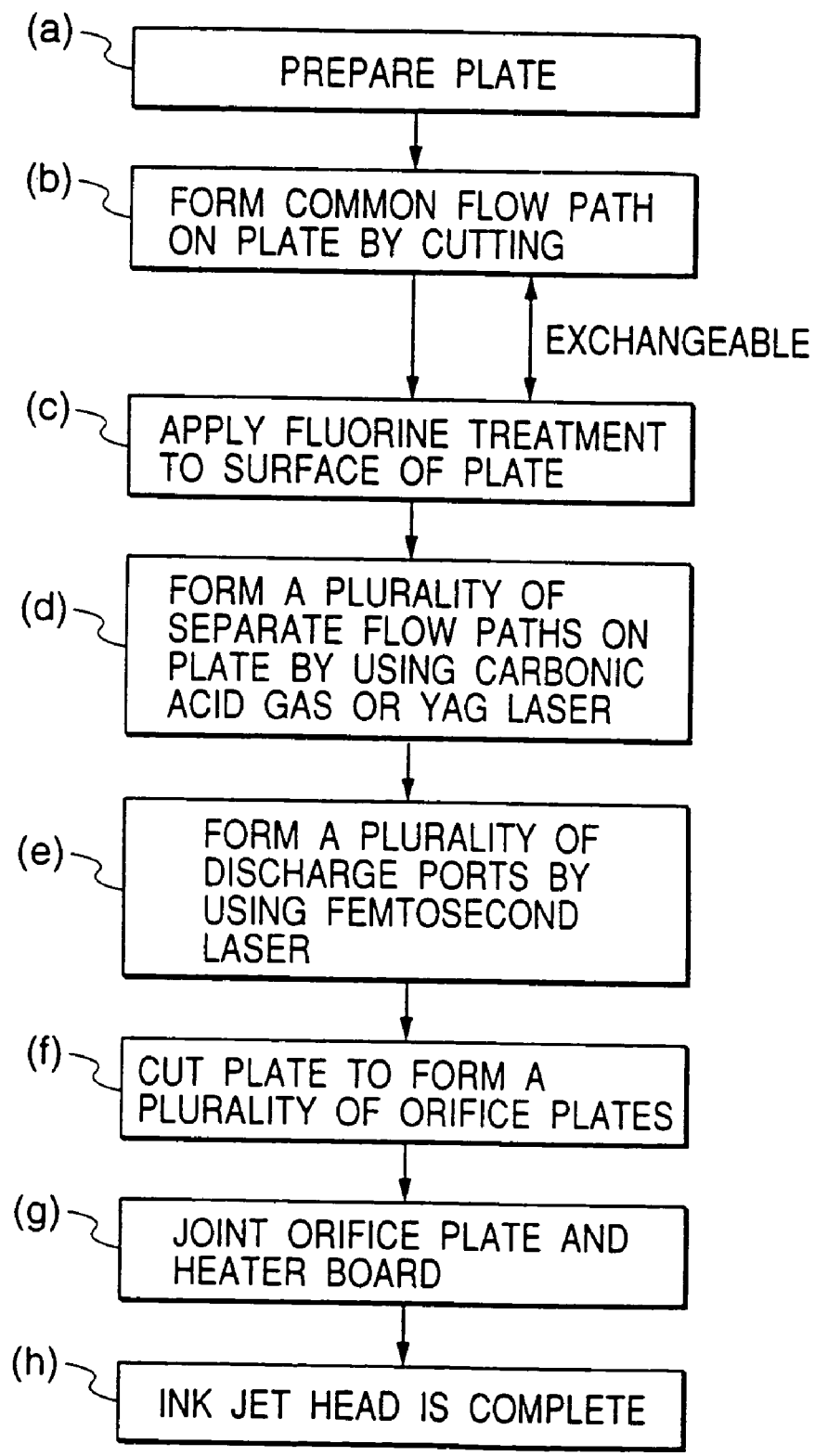
FIG. 11 is a flow chart for explaining another example of an ink jet head manufacturing method according to the third embodiment of the present invention.

In the third embodiment, as shown in FIG. 8 and FIGS. 9A to 9D, after a fluorocarbon film is formed on a carbon substrate in the same manner as the first embodiment, grooves constituting respective ink flow paths 8 corresponding to discharge ports are formed in a portion of an ink flow path constituting member of the carbon substrate by using $CO_2$ gas or a YAG laser. Thereafter, as is in the first embodiment, a plurality of discharge ports communicated with the respective grooves are firmed by using the femtosecond laser. Then, the substrate is divided to obtain a plurality of orifice plates 1a as shown in FIG. 10.

Figure 13:
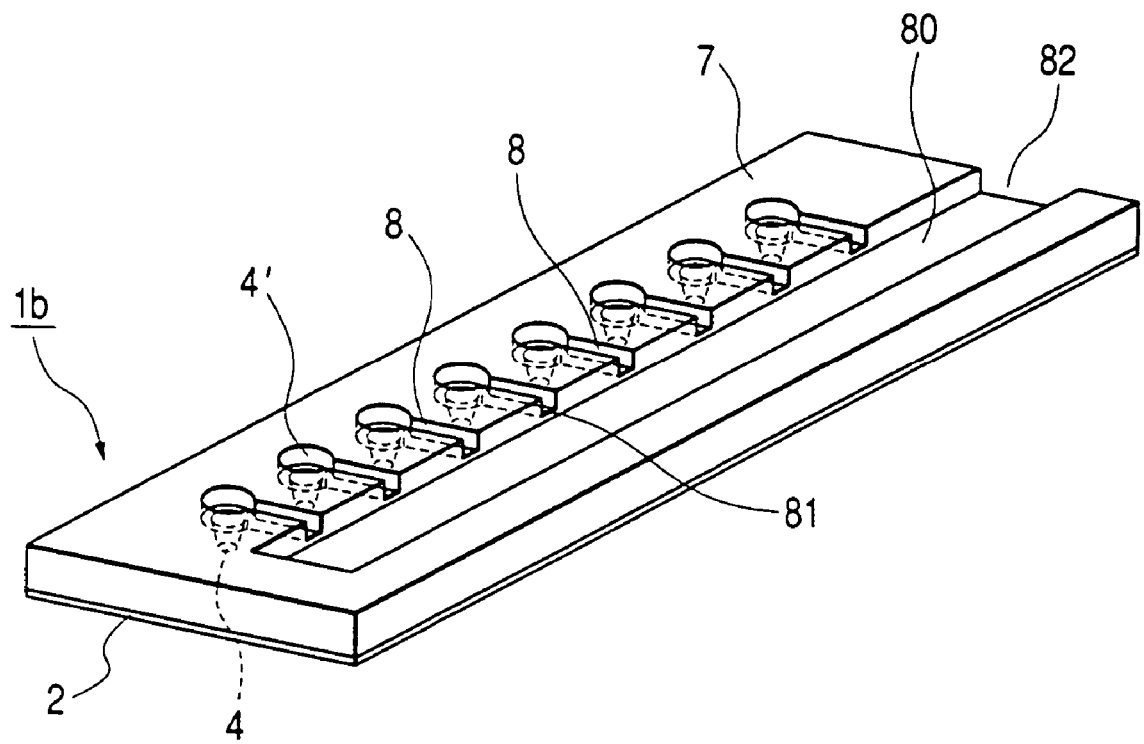
FIG. 13 is a schematic perspective view showing another example of an orifice plate constituting the ink jet head according to the third embodiment of the present invention.
Figure 14:
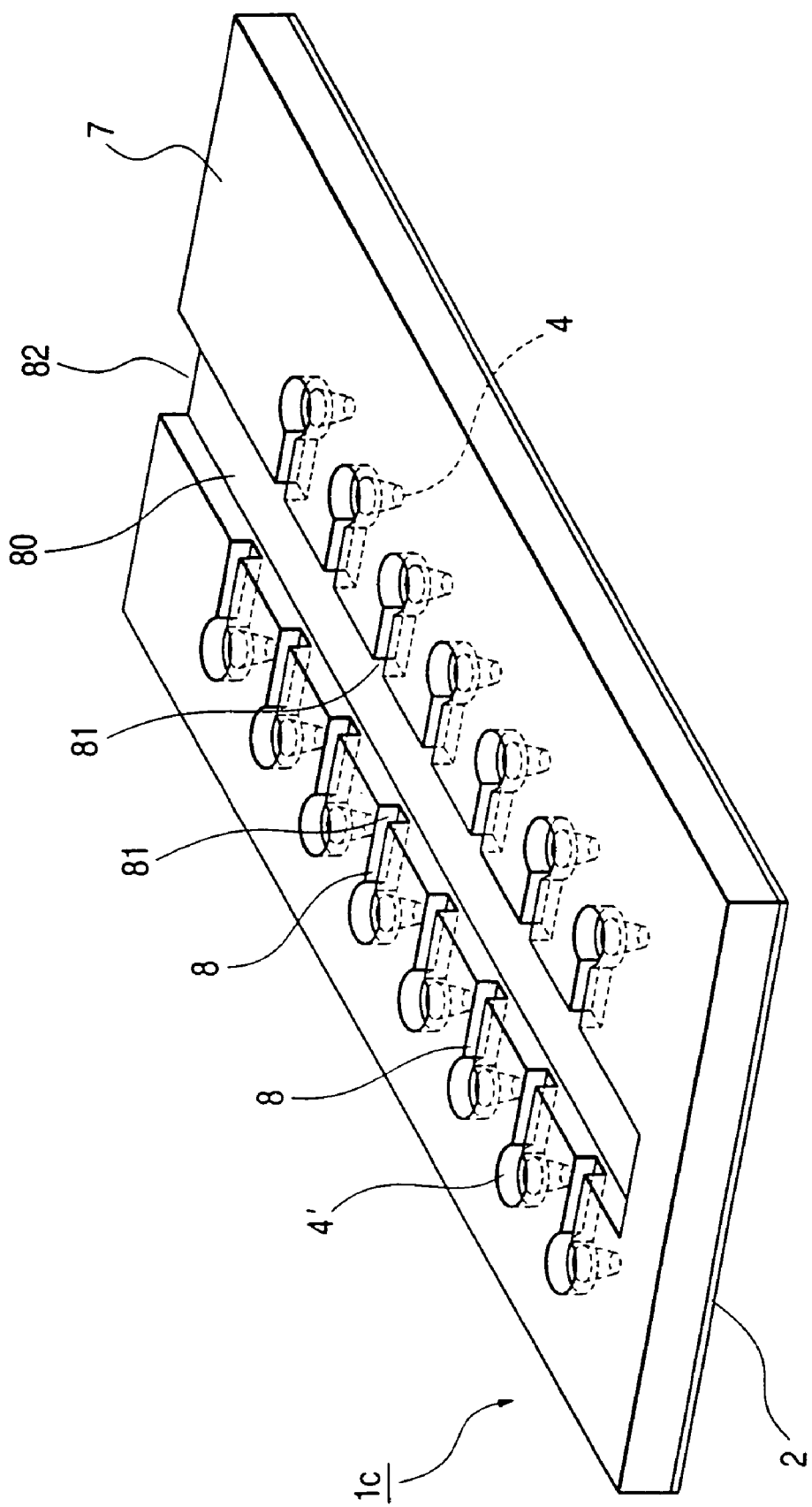
FIG. 14 is a schematic perspective view showing a further example of an orifice plate constituting the ink jet head according to the third embodiment of the present invention.
Figure 15:
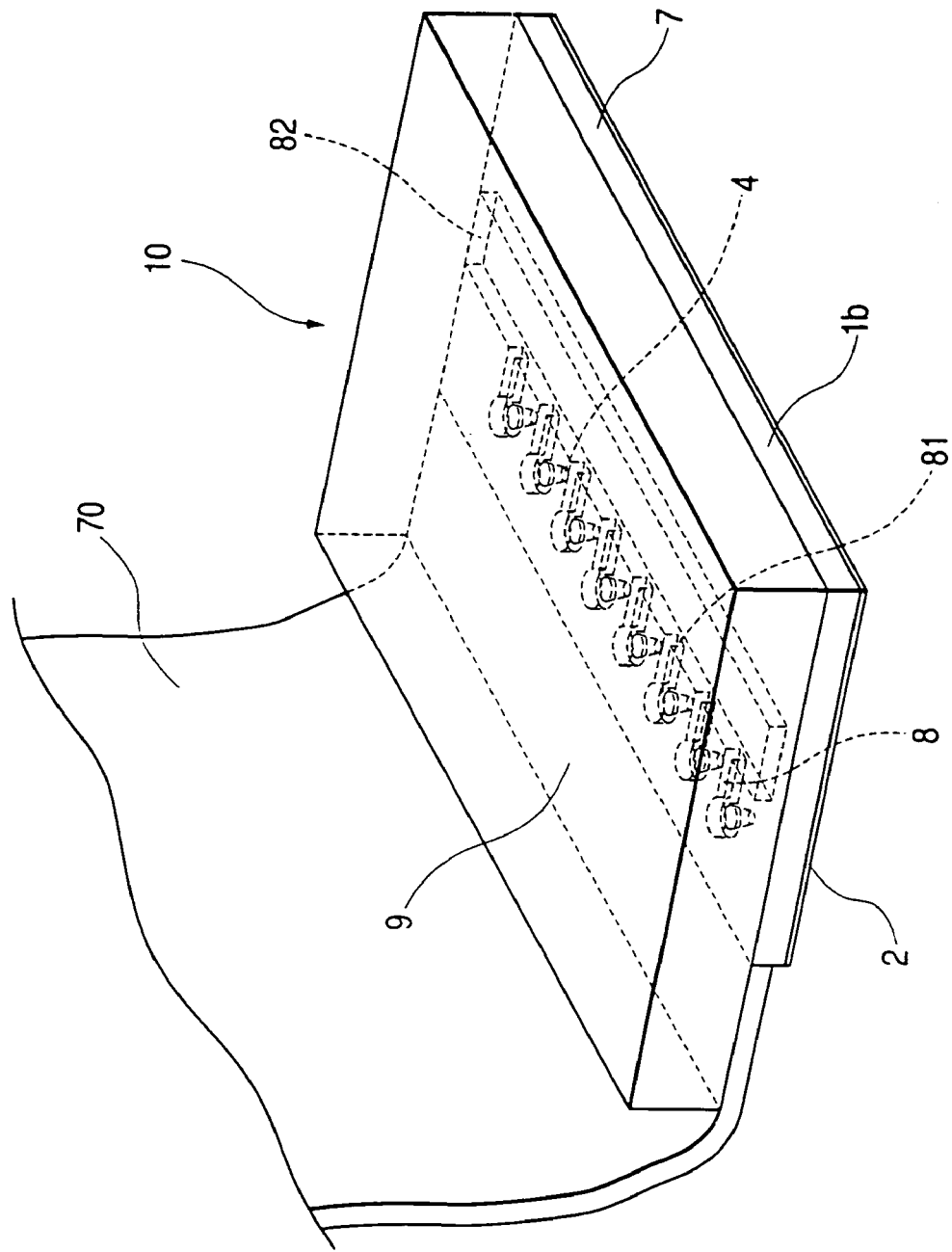
FIG. 15 is a schematic perspective view showing an example of the ink jet head according to the third embodiment of the present invention.
Figure 16:
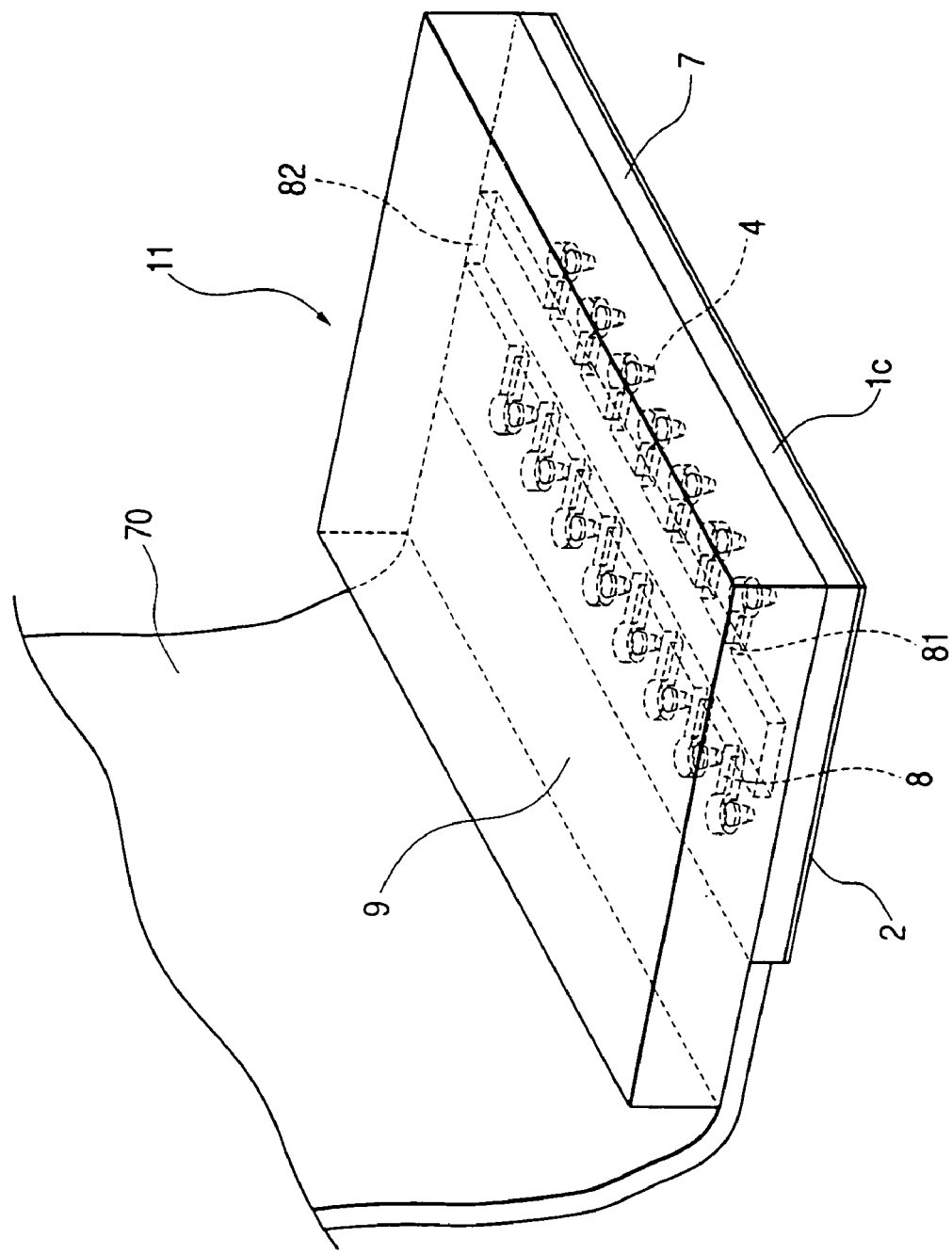
FIG. 16 is a schematic perspective view showing another example of the ink jet head according to the third embodiment of the present invention.

Further, as shown in FIG. 11 and FIGS. 12A to 12D, before or after the fluoride film is formed on the carbon substrate, common ink flow paths 80 each communicated with a plurality of associated ink flow paths may be formed by cutting, and, thereafter, the respective ink flow paths may be formed in the carbon substrate on which the fluoride film was formed. In this case, a plurality of orifice plate 1b, 1c as shown in FIGS. 13 and 14 can be obtained. By attaching the orifice plates 1b, 1c to the ink jet driving element portion 9 by using an adhesive, ink jet heads 10 as shown in FIGS. 15 and 16 are formed. Similarly, the orifice plate shown in FIG. 10 can also be used to obtain an ink jet head as shown in FIG. 15 by forming a common ink flow path (not shown).

Further, since the ink jet driving element portion 9 is provided with a signal terminal (not shown) for ink jet driving, by bump-connecting a signal cable 70 to the signal terminal, an ink jet head 10 capable of discharging the ink jet can be manufactured.

Naturally, the ink is supplied through a common ink flow-in port 82 or respective ink flow-in ports 81 provided in the ink jet head 10 by means of an ink supply pipe and supplying means.

EXAMPLE 2

Next, an example 2 of the present invention will be explained with reference to FIG. 11 and FIGS. 12A to 12D.

First of all, c/c composite crystal carbon body manufactured by Nissin Boseki Co., Ltd. (Japan) was cut to obtain a plate member having a thickness of about 0.2 mm, and both surfaces of the plate member were polished to form a carbon plate having a thickness of 0.135 mm.

Figure 12A:
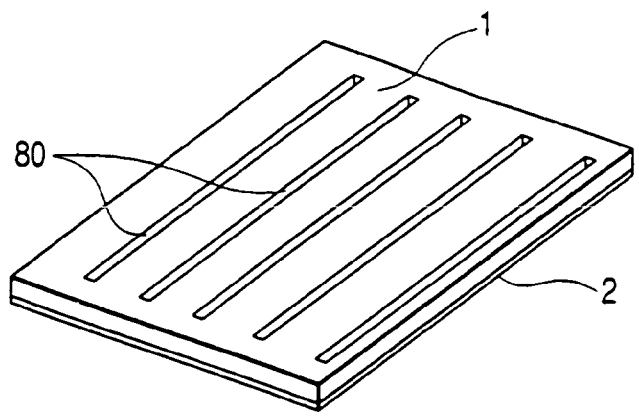
FIGS. 12A, 12B, 12C and 12D are views for explaining steps of another ink jet head manufacturing method according to the third embodiment of the present invention.
Figure 12B:
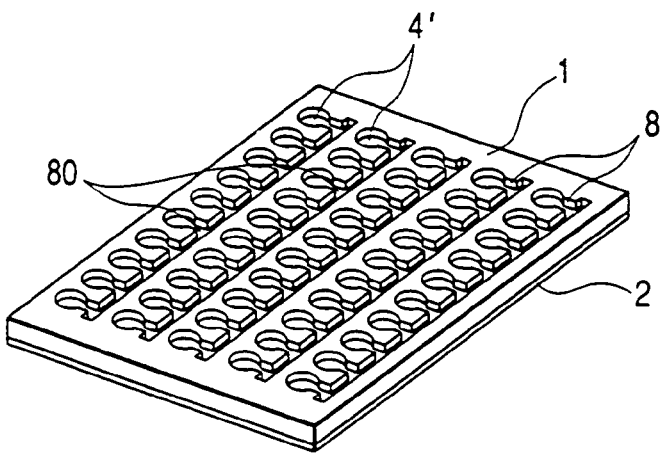
Figure 12C:
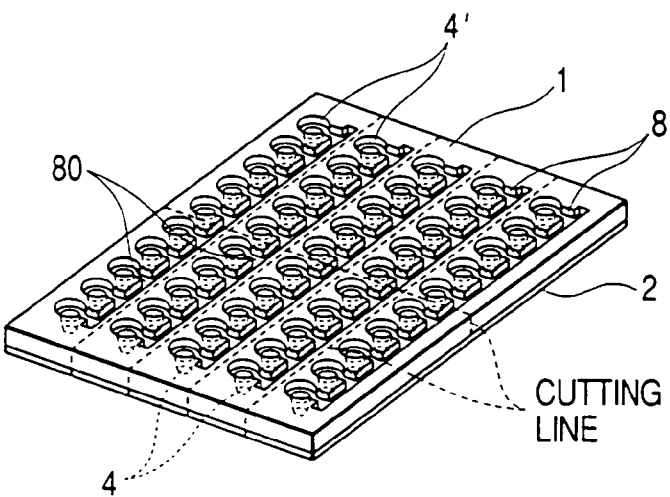
Figure 12D:
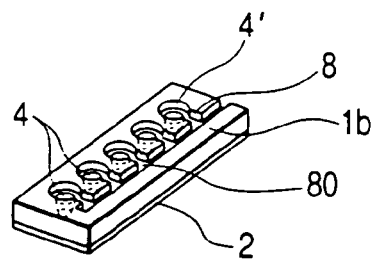

In a condition that the carbon plate 2 is attached to a polishing table, as shown in FIG. 12A, common ink flow paths 80 were formed by a cutting operation. Each common ink flow path 80 had a width of 0.12 mm and a depth of 85 µm.

Then, by using YAG laser and assist gas, individual ink flow paths 8 each having a depth of about 85 µm were formed in the carbon plate. YAG- 701JH manufactured by Sumitomo Juki Co., Ltd. (Japan) was used to the YAG laser, and illumination energy was selected to 0.1 to 16 J/pulse and a pulse time was selected to 0.8 to 8 msec. As an optimum condition, it was found that the illumination energy is 0.1 to 0.3 J/pulse, pulse frequency is 20 Hz and total energy is about 38 J.

In this case, the assist gas as obtained by adding helium gas of about 2% to nitrogen gas of 98%, and the assist gas was injected into a laser worked area to blow out fine carbon particles to be removed, thereby preventing re-adhesion of the carbon particles. Then, similarly, individual liquid chambers 4' for ink jet discharging were formed the YAG laser and the assist gas. In this case, since a depth of each liquid chamber 4' must be about 110 µm in order to enhance re-fill performance after the ink jet discharging, the liquid chambers were worked with total energy of 50 J. A diameter of each liquid chamber 4' is about 28 µm. In this case, a shield mask was used on a portion of 30 µm onto which the laser beam is illuminated. In this way, the common ink flow paths 80, individual ink flow paths 8 and individual liquid chambers 4' were formed in the carbon substrate 2. The working of the common ink flow paths 80 and the individual ink flow paths is not limited to the illustrated method, but, an amount of laser and/or an amount of assist gas may be changed appropriately. Thereafter, the carbon substrate 2 was detached from the polishing table (also acting as a holding table), and, then, the carbon substrate was attached to a support member made of zirconium oxide so that the worked surface (on which the common ink flow paths 80 and the like exist) were not exposed to outside.

Electrodes were attached to the support member which was in turn immersed into molten salt of mixture of sodium fluoride and calcium fluoride at a temperature of 800 to 1000° C. within inert gas atmosphere.

Then, molten salt electrolysis treatment was effected for 30 to 40 minutes under current density of 120 to 150 A/m$^2$. As a result, the electrolysis-treated surface was changed to a surface representing strong ink repellency. Then, the assembly was picked up from the molten salt, and the carbon substrate 2 was detached from the support member made of zirconium oxide. After the molten salt electrolysis treatment was effected, the cutting operation for forming the common ink flow paths and the formation of the individual flow paths and individual liquid chambers may be performed. Then, the substrate 2 was attached to a support table for the femtosecond laser working.

Then, the laser working was effected under a condition that a laser beam wavelength is 775 nm, pulse radiating time is 150 femtoseconds or less, energy of laser illumination beam per pulse is 15 µJ and illumination energy density (fluence) per pulse is about 1 J/cm$^2$.

One pulse illumination permits abrasion removal of about 6 µm and pulse illumination was effected by four times. As a result, it was possible to form discharge ports each having a diameter of about 15 µm. In this case, the assist gas was constituted by nitrogen gas of 90% and oxygen of 10% and was injected onto the femtosecond laser illuminating surface at a feeding amount of 100 ml/sec.

Upon illumination of femtosecond laser, light emitting flame was observed instantaneously. It is considered that the flame is generated when abraded carbon atoms are combined with oxygen to create $CO_2$ gas which is in turn sublimated.

By this method, it was possible to form the good discharge ports. In the formation of through discharge ports, it is desirable that the femtosecond laser working and the YAG laser working be effected from a side where the ink repellent surface does not exist (i.e., side on which the ink repellent surface is not formed).

Since a single discharge ports or about ten discharge ports are formed in this way, then, such operations may be repeated by plural times to complete the desired number of discharge ports.

A laser amount and an amount of assist gas may be changed appropriately in accordance with a thickness and/or area to be worked.

(Fourth embodiment)

Figure 17:
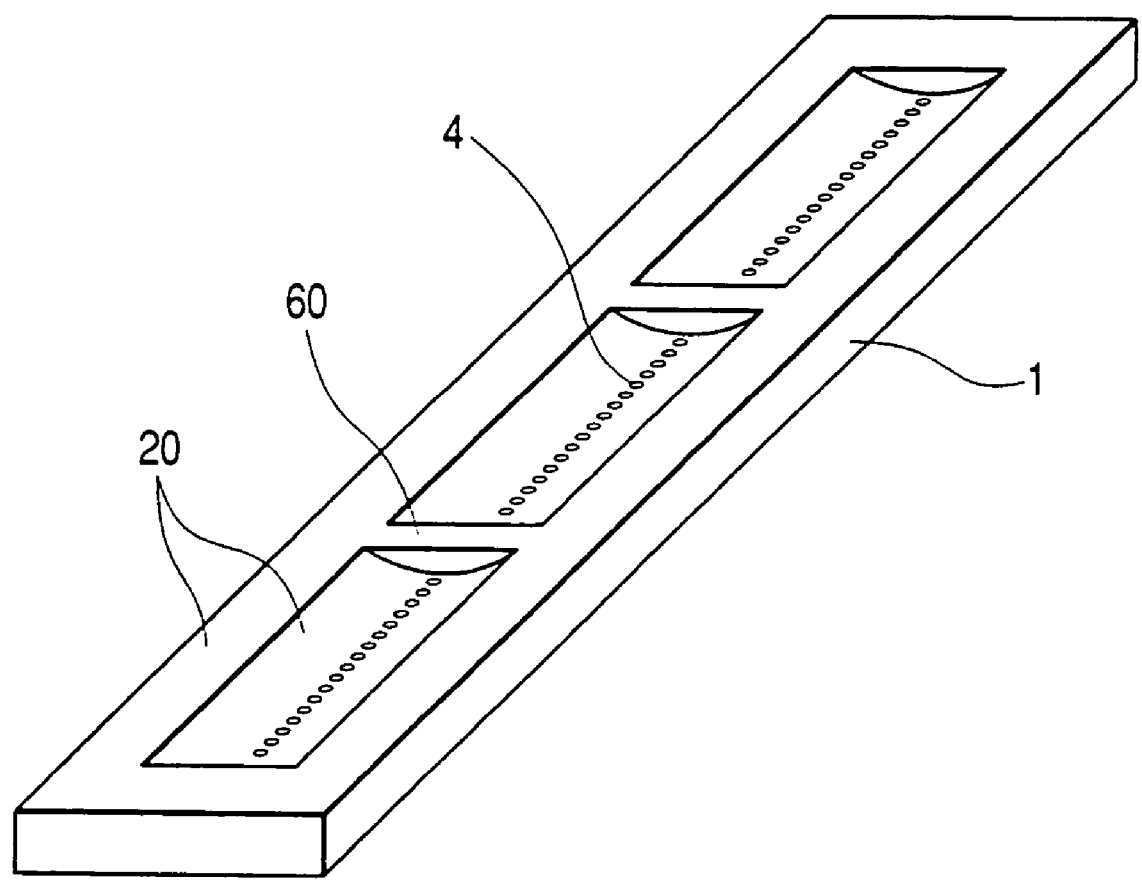
FIG. 17 is a schematic perspective view showing an orifice plate constituting an ink jet head according to a fourth embodiment of the present invention.

A fourth embodiment of the present invention differs from the first embodiment in the point that ribs for reinforcing the orifice plate are formed on the discharge port surface as shown in FIG. 17. The other constructions are the same as those in the first embodiment.

Figure 18:
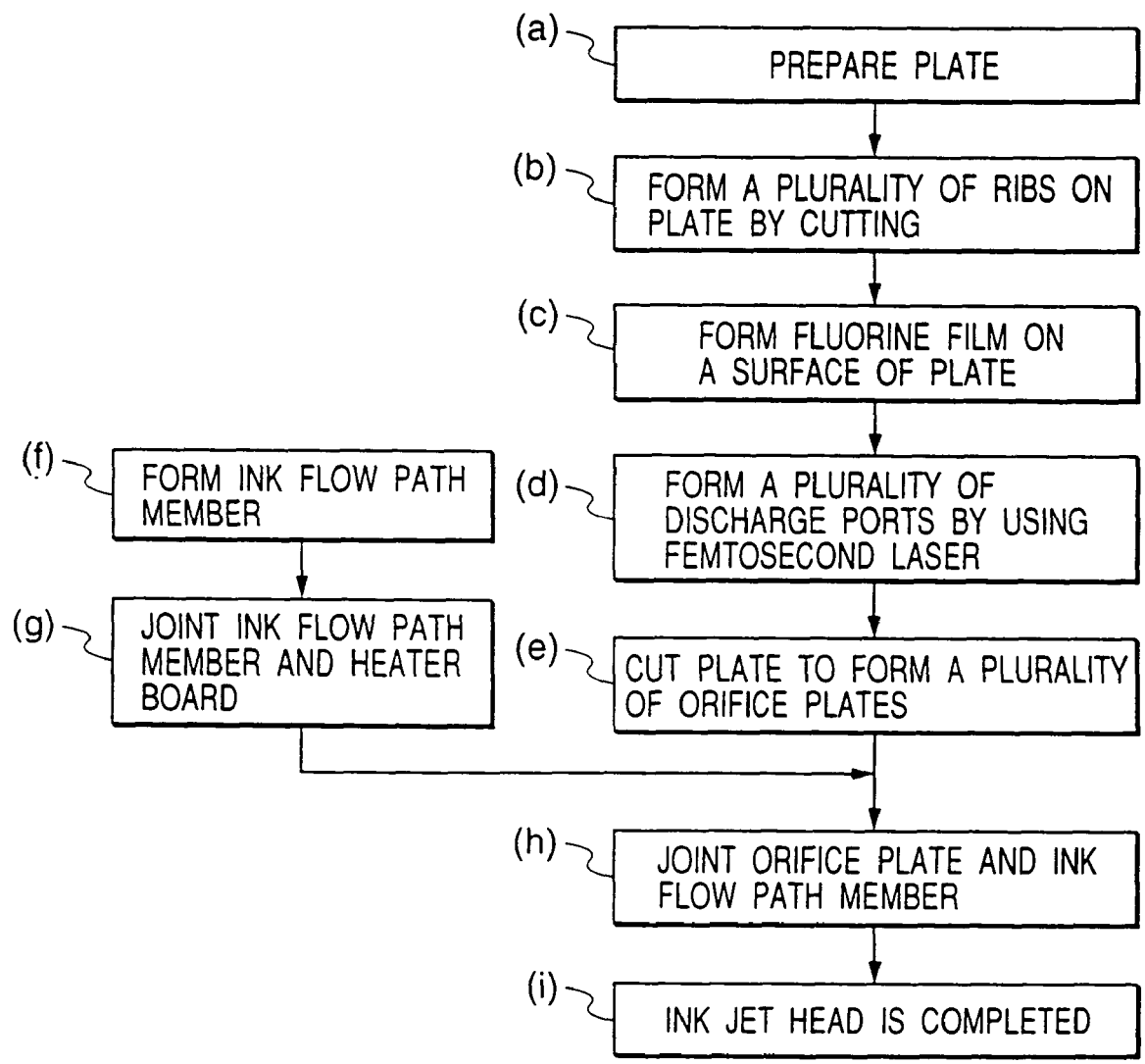
FIG. 18 is a flow chart for explaining an example of an ink jet head manufacturing method according to the fourth embodiment of the present invention.
Figure 19:
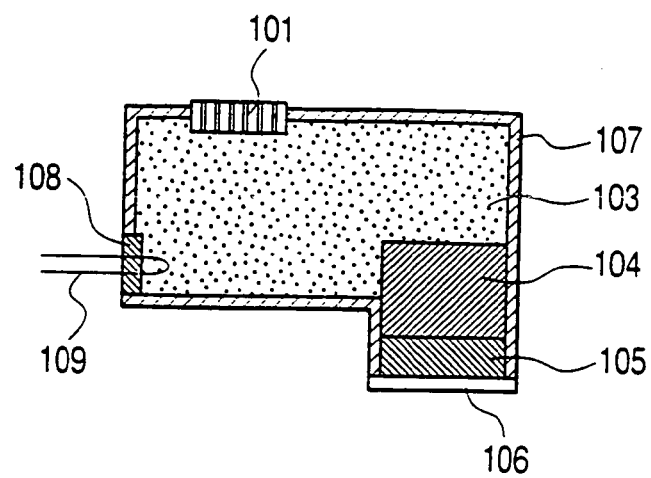
FIG. 19 is a schematic perspective view showing an ink jet head according to a fifth embodiment of the present invention.

As shown in FIG. 18, since ribs 60 can be formed by grinding the orifice plate 1 by a lathe or a grinding machine before the fluorocarbon film is formed on the carbon substrate. In the grinding, the orifice plate 1 can be mirror-finished by changing a grinding blade or a cutter and/or auxiliary additive liquid, and mirror-finish grinding liquid including diamond particles can be used as the auxiliary additive liquid.

(Fifth embodiment)

Further, the liquid repellent member according to the present invention can be used in an ink supplying system as will be described hereinbelow.

As methods for supplying the ink to the ink jet head, there are a method for supplying the ink by forcibly pressurizing the ink and a method for supplying the ink by utilizing a capillary force (meniscus) of the discharge port of the ink jet discharge element portion, and the latter method for supplying the ink by utilizing the capillary force includes a method for supplying the ink by sucking the ink from the discharge port. Namely, the supplying methods are generally divided into the pressurization supplying method and the suction supplying method. In these methods, if a required ink supplying amount is not measured by any appropriate means, excess ink (ink exceeding a storing capacity of the ink jet head) supplied to the ink jet head will be discarded as waste or useless ink. However, it is considerably difficult to measure the consumed ink amount correctly. The reason is that the consumed ink amount is little (about 0.1 ml/min) and measurement thereof requires delicate measuring device which is very expensive. Alternatively, although the consumed ink amount can be measured roughly by counting the number of ink discharge times from the discharge ports of the ink jet head by any appropriate means and by multiplying the counted discharge number by an ink jet discharge amount (several pl) per each time, such a measured value is not always correct. The reason is that, since the total number of discharge ports is several hundreds and all discharge ports slightly differ from each other, rough multiplication does not provide the correct value. Further, even when the ink amount to be supplied is known, it is relatively difficult to supply the ink while measuring the ink supplying amount correctly, and an apparatus for achieving such ink supplying becomes expensive.

Accordingly, in the conventional ink jet printers, when the ink is consumed, every certain timing, ink having an amount greater than an estimated ink consumption amount (rough consumed amount obtained by the above-mentioned multiplication) by 1.5 to 2 times was supplied by the forcible pressurization supplying or the suction supplying. Thus, waste ink was used excessively and useless. To solve such a problem, only the ink amount corresponding to the consumed ink amount may be supplied.

To this end, in the present invention, as a result of zealous investigation, a method for supplying the ink corresponding to the consumed ink amount by using a member having a strong ink repellent film as a gas/liquid separating member was found.

In this method, when the ink is consumed by the ink jet head, since an amount of air corresponding to the consumed ink amount enters into the ink jet head, the ink corresponding to the air amount may be supplied. A portion into which air easily enters and is accumulated and a portion in which ink is easily accumulated are provided in the ink jet head, and the portion in which the air is easily accumulated is directed to a direction of the ink jet discharge element so that the air enters in accordance with the consumed ink amount is gathered in the portion in which the air is easily accumulated, from which the air is sucked and discharged through the air suction hole, and the ink is supplied alternatively. In this way, a system in which the ink corresponding to the consumed ink amount can be supplied is provided. If the suction is continued, although excessive ink is also sucked, when the strong ink repellent gas/liquid separating member is provided at the air suction hole and the suction pressure is selected to be a pressure level in which the ink is not sucked by the ink repellent gas/liquid separating member, the air is discharged but the ink is not discharged, thereby supplying the ink corresponding to the consumed ink amount.

Figure 22:
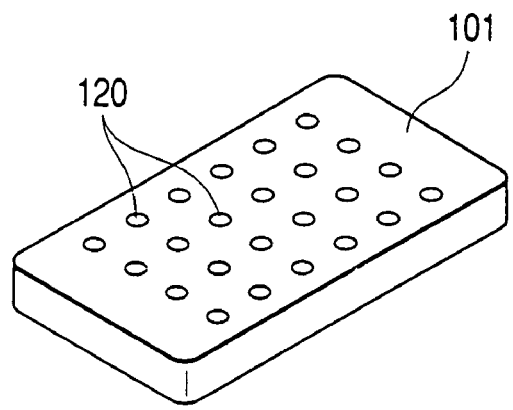
FIG. 22 is a schematic perspective view of the gas/liquid separating member of the ink jet head of FIG. 19.
Figure 23:
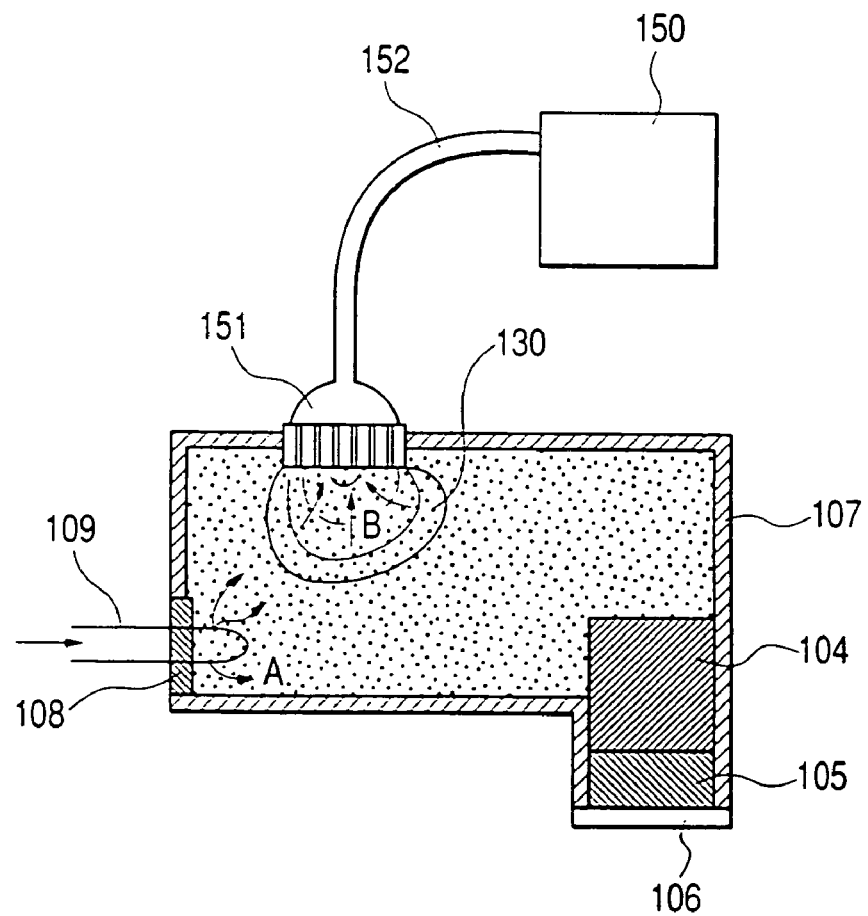
FIG. 23 is a schematic sectional view showing a condition that an air suction device and an ink supplying needle are connected to the ink jet head of FIG. 19.

FIG. 23 shows an example of a preferred construction according to the present invention and is a schematic sectional view of an ink jet head according to such an example. An ink absorbing body 103 and an absorbing body 104 having an absorbing force greater than that of the ink absorbing body 103 are provided within a frame 107 of the ink jet head. Further, an ink jet discharge element 106 is positioned at a tip end of the frame 107, and an ink storage space 105 is defined between the absorbing body 104 and the ink jet discharge element 106. Further, as shown in FIG. 23, a strong ink repellent gas/liquid separating member 101 is contacted with the absorbing body 103. A supply joint 108 made of rubber is provided as an ink supply joint for ink supplying, and an ink supply needle 109 can be pierced to permit the ink supplying. An average cell diameter of the absorbing body 103 is 50 to 70 μm and an average cell diameter of the absorbing body 104 is 30 to 50 μm. Since a diameter of the discharge port of the ink jet discharge element 106 is about 15 to 20 μm, a meniscus maintaining force of about −300 mmAq is given. Namely, if the suction is effected by about −300 mmAq, the meniscus is not broken, thereby keeping the in in the discharge port. Further, the gas/liquid separating member 101 is constituted so that through holes each having a diameter of 0.08 mm (80 μm) to 0.1 mm (100 μm) are formed in a carbon plate having a thickness of 0.1 mm at an interval of about 0.15 mm. FIG. 22 schematically shows the gas/liquid separating member. Further, an FC (fluorocarbon) ink repellent film is formed on a surface of the gas/liquid separating member 101 by fluoride molten salt electrolysis. This arrangement has a characteristic that, even when the gas/liquid separating member 101 is contacted with an upper surface of the ink and the air is sucked through the holes of the gas/liquid separating member 101 at suction pressure of −400 mmAq, the ink is not sucked. However, the air can pass through the air suction holes 120 without any resistance. If the FC ink repellent film is not provided, the ink will easily be sucked even at pressure of about −10 mmAq. An ink jet discharge element of BTJ type used in BJF-850 printer manufactured by Canon Inc. is used as the ink jet discharge element 106.

Figure 20:
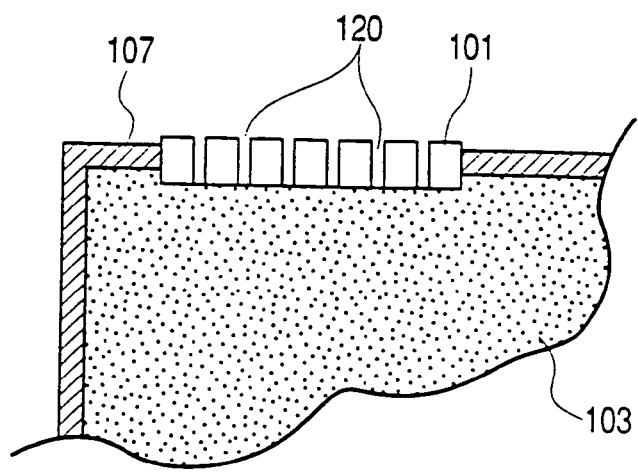
FIG. 20 is a schematic enlarged view showing a part of a gas/liquid separating member in the ink jet head in FIG. 19.
Figure 21:
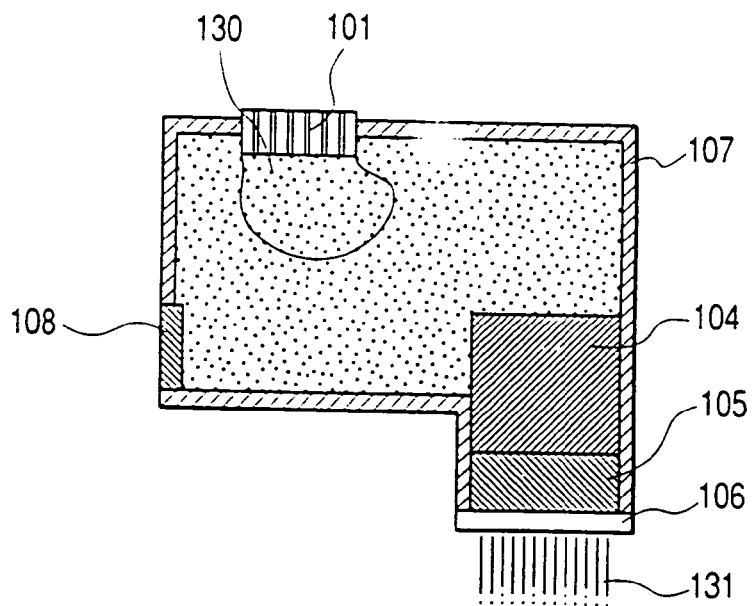
FIG. 21 is a schematic sectional view showing a condition that ink is consumed and air enters in the ink jet head of FIG. 19.

In the ink jet head (FIG. 23) constructed in this way, when the ink jet head is operated for the printing, the ink 131 (FIG. 21) is discharged by the ink jet discharge element 106 and the amount of ink in the ink absorbing body 103 is decreased. Correspondingly, the air 130 enters into the ink jet head through the air suction holes 120 (FIG. 20) provided in the gas/liquid separating member 101, thereby establishing a condition shown in FIG. 21. Of course, it should be noted that the greater the consumed ink amount the greater the entering amount of air 130 correspondingly. When the predetermined printing operation is finished, the ink jet head is shifted to a home position of the ink jet printer and is stopped there. Then, as shown in FIG. 23, the ink supply needle 109 is pierced into and mounted to the rubber joint 108. At this point, the gas/liquid separating member 101 is covered by an air suction cap 151 connected to an air suction device 50 through an air supply pipe 152, and the air is sucked at the suction pressure of −150 to −200 mmAq. As a result, the air 130 entered into the ink jet head is discharged toward the air suction device 150 as shown by the arrows B in FIG. 23, and the ink is supplied from the ink supply needle as shown by the arrows A. Even when the air continues to be sucked through the air suction holes 120 as it is, the gas/liquid separating member 101 is operated, with the result that the ink is not discharged through the air suction holes 120. In this way, the condition shown in FIG. 21 can be changed to a condition that the ink was supplied. With this arrangement, even when the consumed ink amount is not measured, it is possible to always supply the ink corresponding to the consumed ink amount stably and to prevent the ink from being discharged excessively.

Figure 24:
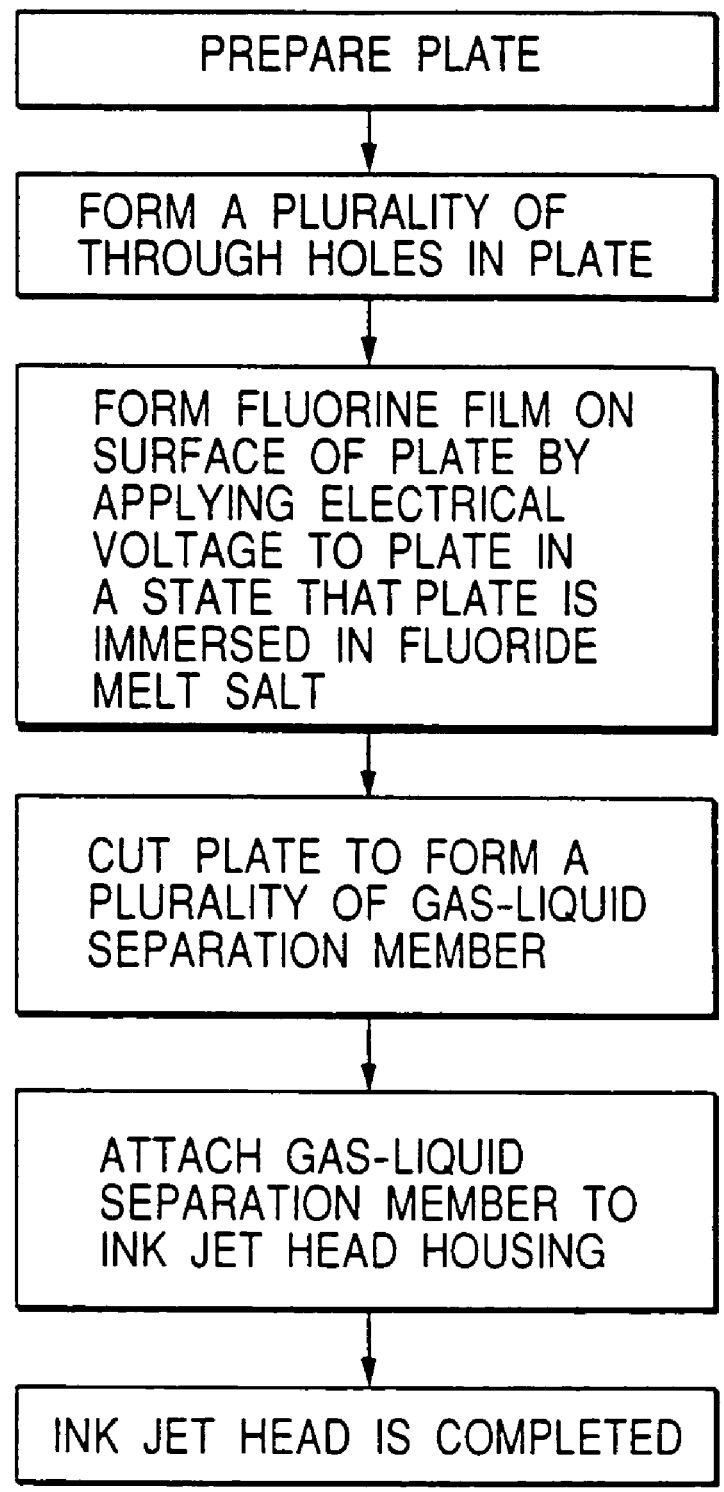
FIG. 24 is a flow chart for explaining an example of a method for manufacturing the ink jet head of FIG. 19.
Figure 25A:
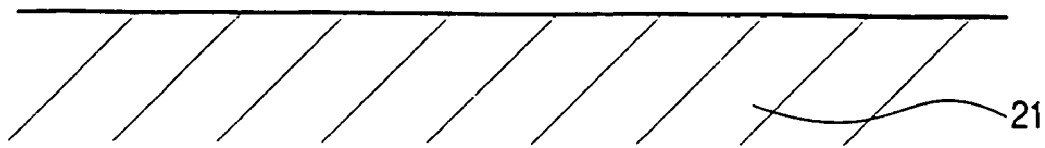
FIGS. 25A, 25B and 25C are schematic sectional views for explaining fluoridation processing for a discharge port surface in a conventional ink jet head.
Figure 25B:
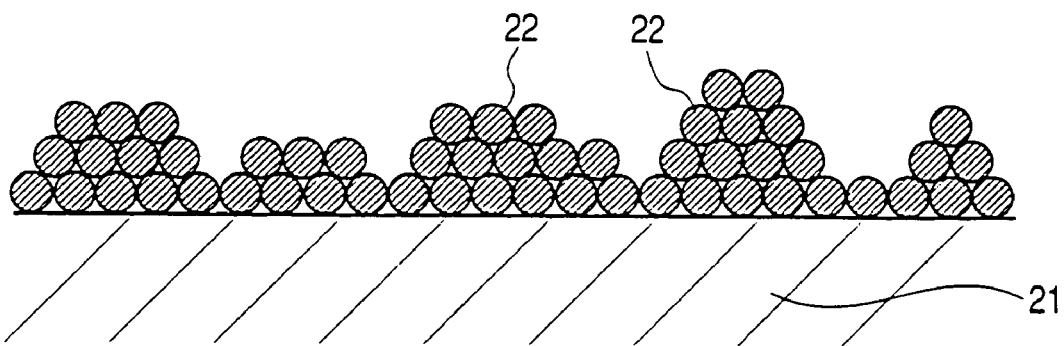
Figure 25C:
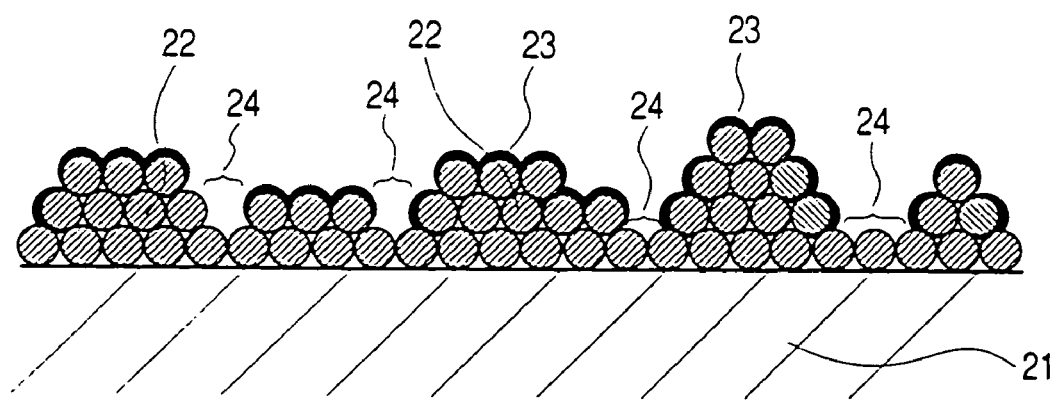
Figure 26:
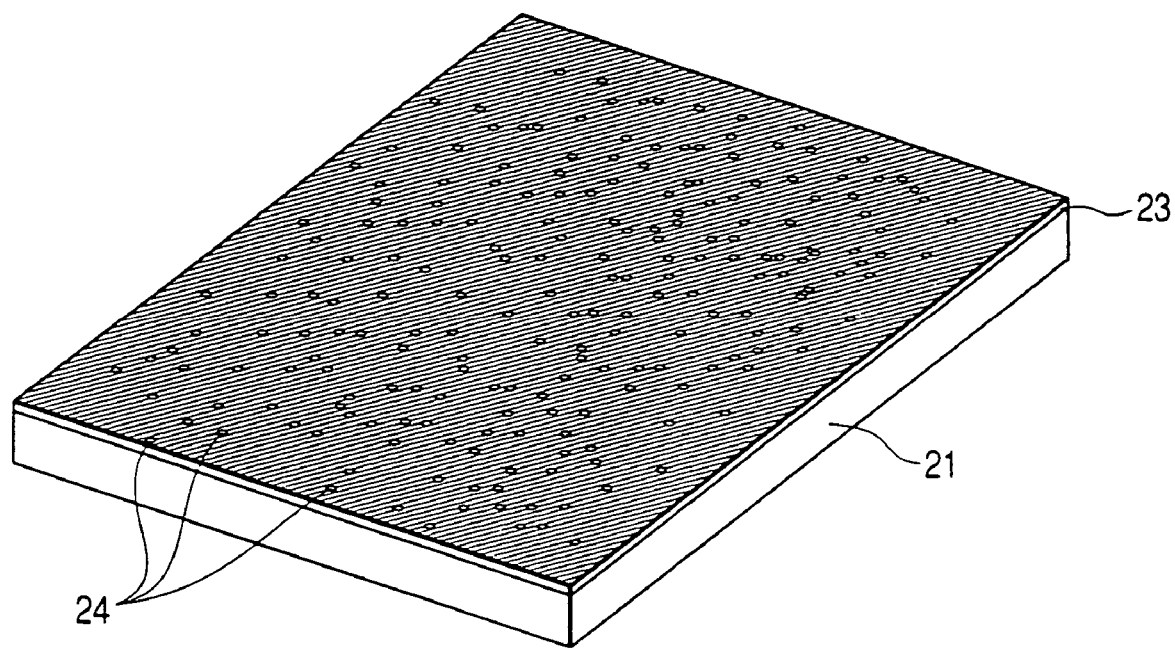
FIG. 26 is a schematic perspective view for explaining the fluoridation processing for the discharge port surface in the conventional ink jet head.

The ink jet head having the gas/liquid separating member is manufactured by steps shown in FIG. 24. The gas/liquid separating member 101 is formed by using the carbon substrate having the opened air suction holes 120 as anode and by immersing the substrate into molten salt of mixture of sodium fluoride and calcium fluoride at a temperature of 800 to 1000° C. within nitrogen gas atmosphere and by effecting electrolysis treatment with current density of 150 A/m$^2$ for 20 minutes. The longer the electrolysis treatment time the thicker the FC (fluorocarbon) film formed on the carbon substrate. Particularly, in the molten salt electrolysis method, it is possible to form the FC film within the holes each having a diameter of about 0.08 mm in the carbon substrate. The reason is that, when the FC film is formed on the carbon substrate, since electrical resistance is increased, current is concentrated into the holes having lower electrical resistance, with the result that the FC film is formed in the holes. As such, since the current is concentrated in portions having lower electrical resistance (namely, portions having no FC film or portions having thinner FC film) and the FC film is formed from the portion having thinner FC film successively, the stable and uniform FC (fluorocarbon) film is formed on the surface of the carbon substrate. Further, the formation of the holes having the diameter of 0.08 to 0.1 mm in the carbon substrate may be effected by laser working or cutting working using a minute drill. Alternatively, before the carbon substrate is fired, holes having a diameter of about 0.1 to 0.125 mm may be formed in a polycarbodiimide resin substrate by machine working such as punching and then the substrate may be fired. In this case, larger holes must be formed by the punching to obtain the proper holes after the firing by previously calculating the firing contraction rate.

Further, rather than the single carbon substrate, plural carbon substrates may be overlapped. For example, a number of holes having a diameter of about 0.03 mm may be formed in a polycarbodiimide resin sheet having a thickness of about 30 μm, and a plurality of such sheets may be laminated so that the holes are not aligned with each other completely and a through-hole ratio corresponding to total area of holes having a diameter of about 0.1 mm is established, and then, the laminated sheets may be fired to obtain laminated carbon substrate. Any substrate may be adopted so long as a fluorocarbon film having a gas/liquid separating function permitting the suction of air and preventing passage of liquid such as ink can be formed. If possible, a fluorocarbon ink repellent film may be formed on a sponge-like or non-woven cloth-like carbon substrate.

Incidentally, in the first to fifth embodiments, while an example that the ink repellent film is formed on the plate (substrate) comprised of carbon by the electrolysis treatment in the molten salt of fluoride was explained, the substrate is not limited to carbon. Any material can be used in the substrate so long as the material is not soluble in the molten salt of fluoride (i.e., maintaining solid at a temperature of 800 to 1000° C.) and is conductive (i.e., can be subjected to electrolysis treatment). As, material for the substrate having such property, for example, there is Si (Silicon), Ta (Tantalum), zirconium carbide, Tantalum carbide as well as carbon.

What is claimed is:

1. A method for manufacturing a discharge-port-forming member for use in an ink jet head, the member having a plurality of discharge ports for discharging ink and comprising a carbon substrate and an ink-repellent film formed on a surface of the substrate by bonding between carbon and fluorine, said method comprising the steps of:

polishing the surface of the carbon substrate to be flat while another surface of the carbon substrate opposite to the surface of the carbon substrate being polished is fixed onto a polishing table;

forming the ink-repellent film on the polished surface of the carbon substrate by applying a voltage to the carbon substrate while the polished surface of the carbon substrate is immersed in a molten salt of fluoride and the other surface of the carbon substrate is fixed to the polishing table; and forming the plurality of discharge ports on the carbon substrate having the ink-repellent film formed thereon.

2. A method for manufacturing a plurality of discharge-port-forming members for use in ink jet heads, the members each having a plurality of discharge ports for discharging ink and each comprising a carbon substrate and an ink-repellent film formed on a surface of the carbon substrate by bonding between carbon and fluorine, said method comprising the steps of:

polishing a surface of a carbon plate to be flat while another surface of the carbon plate opposite to the surface of the carbon plate being polished is fixed onto a polishing table, the carbon plate corresponding to a plurality of carbon substrates;

forming an ink-repellent film on the polished surface of the carbon plate by applying a voltage to the carbon plate while the polished surface of the carbon plate is immersed in a molten salt of fluoride and the other surface of the carbon plate is fixed to the polishing table;

forming a plurality of discharge ports on the carbon plate having the ink-repellent film formed thereon; and dividing the carbon plate having the ink-repellent film formed thereon into the plurality of carbon substrates.

3. A method according to claim 1, wherein the step of forming the plurality of discharge ports comprises a femtosecond laser onto portions of the discharge-port-forming member corresponding to locations for the plurality of discharge ports of the discharge-port-forming member.

\* \* \* \* \*

UNITED STATES PATENT AND TRADEMARK OFFICE
CERTIFICATE OF CORRECTION

PATENT NO. : 7,074,314 B2
APPLICATION NO. : 10/649659
DATED : July 11, 2006
INVENTOR(S) : Masataka Eida et al.

It is certified that error appears in the above-identified patent and that said Letters Patent is hereby corrected as shown below:

ON THE TITLE PAGE
(Item 30), Foreign Application Priority Data, "Jan. 31, 2002 (JP)...............2001-023693" should read --Jan. 31, 2002 (JP)...............2002-023693--.

COLUMN 2
Line 7, "unevenness microscopically" should read --even microscopically--.
Line 29, "operations" should read --operations are--.

COLUMN 5
Line 40, "discharging" should read --discharge--.

COLUMN 7
Line 41, "in" (second occurrence) should read --of--.

COLUMN 9
Line 21, "within the" should read --in--.
Line 44, "in" (second occurrence) should read --ink--.

COLUMN 10
Line 17, "firm" should read --film--.
Line 24, "talk" should read --talc--.

COLUMN 11
Line 8, "subjected" should read --subjected to a--.
Line 17, "or" should read --of--.
Line 18, "after a" should read --after--.
Line 43, "subjected" should read --subjected to--.

COLUMN 12
Line 52, "firmed" should read --formed--.

COLUMN 14
Line 29, "ports" (first occurrence) should read --port--.
Line 42, "since" should read --such--.

COLUMN 16
Line 8, "in in" should read --ink in--.
Line 43, "device 50" should read --device 150--.

UNITED STATES PATENT AND TRADEMARK OFFICE
CERTIFICATE OF CORRECTION

PATENT NO. : 7,074,314 B2
APPLICATION NO. : 10/649659
DATED : July 11, 2006
INVENTOR(S) : Masataka Eida et al.

It is certified that error appears in the above-identified patent and that said Letters Patent is hereby corrected as shown below:

COLUMN 17
Line 26, "0.03 mm" should read --0.3 mm--.
Line 47, "As," should read --As--.

COLUMN 18
Line 44, "comprises" should read --comprises projecting--.

Signed and Sealed this

Seventeenth Day of April, 2007

JON W. DUDAS
*Director of the United States Patent and Trademark Office*